(12) United States Patent
Kim et al.

(10) Patent No.: US 12,085,214 B2
(45) Date of Patent: *Sep. 10, 2024

(54) VACUUM ADIABATIC BODY AND REFRIGERATOR

(71) Applicant: LG ELECTRONICS INC., Seoul (KR)

(72) Inventors: Daewoong Kim, Seoul (KR); Wonyeong Jung, Seoul (KR); Deokhyun Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,481

(22) Filed: Apr. 19, 2023

(65) Prior Publication Data

US 2023/0250918 A1    Aug. 10, 2023

Related U.S. Application Data

(63) Continuation of application No. 16/981,376, filed as application No. PCT/KR2019/007755 on Jun. 26, 2019, now Pat. No. 11,662,053.

(30) Foreign Application Priority Data

Jun. 27, 2018  (KR) .................. 10-2018-0074203

(51) Int. Cl.
| | |
|---|---|
| *F16L 59/065* | (2006.01) |
| *F25D 23/06* | (2006.01) |
| *F25B 40/00* | (2006.01) |
| *F25D 19/00* | (2006.01) |

(52) U.S. Cl.
CPC .......... *F16L 59/065* (2013.01); *F25D 23/065* (2013.01); *F25B 40/00* (2013.01); *F25D 19/00* (2013.01); *F25D 2201/128* (2013.01); *F25D 2201/14* (2013.01); *Y10T 428/231* (2015.01)

(58) Field of Classification Search
None
See application file for complete search history.

(56) References Cited

U.S. PATENT DOCUMENTS

| | | | |
|---|---|---|---|
| 2,000,882 | A | 5/1935 | Comstock |
| 4,036,617 | A | 7/1977 | Leonard |
| 4,139,024 | A | 2/1979 | Adorjan |

(Continued)

FOREIGN PATENT DOCUMENTS

| | | |
|---|---|---|
| CN | 103090630 | 5/2013 |
| CN | 107850375 | 3/2018 |

(Continued)

OTHER PUBLICATIONS

International Search Report and Written Opinion dated Oct. 17, 2019 issued in Application No. PCT/KR2019/007755.

(Continued)

*Primary Examiner* — Alexander S Thomas
(74) *Attorney, Agent, or Firm* — KED & Associates LLP

(57) ABSTRACT

A vacuum adiabatic body includes a support configured to maintain a vacuum space and a pipeline provided in the vacuum space. The pipeline is supported by the support so that a movement of the pipeline is restricted.

21 Claims, 20 Drawing Sheets

(56) References Cited

U.S. PATENT DOCUMENTS

| | | | | |
|---|---|---|---|---|
| 11,662,053 | B2* | 5/2023 | Kim | F16L 3/24 428/69 |
| 2013/0111942 | A1 | 5/2013 | Jung | |
| 2015/0030800 | A1 | 1/2015 | Jung et al. | |
| 2016/0290690 | A1 | 10/2016 | Jung et al. | |
| 2018/0224195 | A1 | 8/2018 | Jung et al. | |
| 2018/0238486 | A1 | 8/2018 | Jung et al. | |
| 2018/0238610 | A1 | 8/2018 | Jung et al. | |

FOREIGN PATENT DOCUMENTS

| | | |
|---|---|---|
| CN | 107850377 | 3/2018 |
| CN | 207436587 | 6/2018 |
| EP | 2 589 905 | 5/2013 |
| JP | H10-170128 | 6/1998 |
| JP | 2017-089945 | 5/2017 |
| KR | 10-0343719 | 6/2002 |
| KR | 10-2006-0062056 | 6/2006 |
| KR | 10-2020-110008186 | 8/2011 |
| KR | 10-2013-0049495 | 5/2013 |
| KR | 10-2015-0012712 | 2/2015 |
| WO | WO 2017/023095 | 2/2017 |

OTHER PUBLICATIONS

Chinese Office Action dated Jul. 22, 2021 issued in Application No. 201980023482.3.

European Search Report issued in Application No. 19826616.5 dated Feb. 17, 2022.

U.S. Office Action dated Apr. 14, 2022 issued in parent U.S. Appl. No. 16/981,376.

U.S. Office Action dated Jul. 20, 2022 issued in parent U.S. Appl. No. 16/981,376.

* cited by examiner

FIG. 4

| Group | | General plastic | | | | Engineering plastic | | | |
|---|---|---|---|---|---|---|---|---|---|
| Material | | (HD)PE ※G-Plastic Reference | PC | Glass fiber PC (30% Glass-F) | ※Low outgassing PC | PCTFE | PPS | LCP | PEEK |
| Out-gassing rate | TML(%) | 0.58 | 0.19 | 0.14 | No Data | 0.01 | 0.06 | 0.06 | 0.26 |
| Compressive Strength | MPa | 31.7 | 82.8 | 124.1 | *80.6 | 37.9 | 107.0 | *151.1 | 137.9 |
| Thermal Conductivity | W/m-k | <0.40 | 0.18 | 0.18 | 0.18 | 0.20 | 0.3 | 0.36 (G/F 50%) | 0.25 |
| Strength /Cond. | MPa-m-k/W | 79 | 460 | 689 | 448 | 189 | 357 | 420 | 552 |
| Heat Deflection Temp at 264 psi | ℃ | 80 | 132 | 146 | 125 | 126 | 121 | 105 ~ 260 | 160 |
| Max Operating Temperature | ℃ | 82 | 121 | 132 | No Data | 132 | 218 | No Data | 249 |
| *Cost(per 1kg) | | Low | $3.1 | $6.2(G/F20%) | $6.7 | High | $30 | $40 | $150 |

VACUUM ADIABATIC BODY AND REFRIGERATOR

CROSS-REFERENCE TO RELATED APPLICATIONS

This application is a Continuation Application of U.S. patent application Ser. No. 16/981,376 filed Sep. 16, 2020 (now U.S. Pat. No. 11,662,053), which application is a U.S. National Stage Application under 35 U.S.C. § 371 of PCT Application No. PCT/KR2019/007755, filed Jun. 26, 2019, which claims priority to Korean Patent Application No. 10-2018-0074203, filed Jun. 27, 2018, whose entire disclosures are hereby incorporated by reference.

BACKGROUND

1. Field

The present disclosure relates to a vacuum adiabatic body and a refrigerator.

2. Background

A vacuum adiabatic body may suppress heat transfer by vacuumizing the interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more may be provided. However, the internal volume of the refrigerator may therefore be reduced.

In order to increase the internal volume of a refrigerator, there is an attempt to apply a vacuum adiabatic body to the refrigerator.

First, Korean Patent No. 10-0343719 (Cited Document 1) of the present applicant has been disclosed. Reference Document 1 discloses a method in which a vacuum adiabatic panel is prepared and then built in walls of a refrigerator, and the exterior of the vacuum adiabatic panel is finished with a separate molding such as Styrofoam. According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Cited Document 2). According to Reference Document 2, fabrication cost is increased, and a fabrication method is complicated.

To solve this problem, the present applicant had filed Korean Patent Application NO. 10-2013-0049495 (Cited Document 3). This technique provides a vacuum adiabatic body in an empty vacuum state without providing a separate adiabatic material therein. In addition, this technique provides a heat exchange pipeline provided in the vacuum adiabatic body. The heat exchange pipeline is a pipeline in which two pipelines, i.e., an inlet pipe of an evaporator and an outlet pipe of the evaporator, contact each other. The heat exchange pipeline is a pipeline in which a refrigerant flowing through the inside of the two pipelines are heat-exchanged with each other to improve performance of a refrigerating cycle.

To allow the heat exchange pipelines to be heat-exchanged only therebetween and reduce a heat loss, the heat exchange pipeline may not contact a plate defining an outer wall of the vacuum adiabatic body. For this, a ring may be inserted into the heat exchange pipeline. The ring may be provided between the heat exchange pipeline and an inner surface of the plate to space the heat exchange pipeline from the plate.

Since an outer circumferential surface of the ring has the same shape as that of an outer circumferential surface of the heat exchange pipeline, and the ring has a closed curve shape, it is very difficult to insert the ring into the heat exchange pipeline.

The ring is made of a solid material and fully contacts the plate to support the plate. Thus, heat of the heat exchange pipeline may be conducted to a case to cause an adiabatic loss.

The ring has to be inserted into a vacuum space before the vacuum adiabatic body is assembled. Thus, after the vacuum adiabatic body is assembled, it is difficult to additionally insert the guide ring when a contact portion between the heat exchange pipeline and the plate occurs. Since the heat exchange pipeline is made of a copper material having weak rigidity and also is bent inside a spacer, it is more problematic.

Since the ring is not fixed, the ring may move from a desired position when a worker handles the heat exchange pipeline. If the ring moves, the position of the ring has to be adjusted again after being assembled.

BRIEF DESCRIPTION OF THE DRAWINGS

The embodiments will be described in detail with reference to the following drawings in which like reference numerals refer to like elements wherein:

FIG. 4 is a diagram illustrating results obtained by examining resins.

DETAILED DESCRIPTION

Technical Problem

Figure 1:
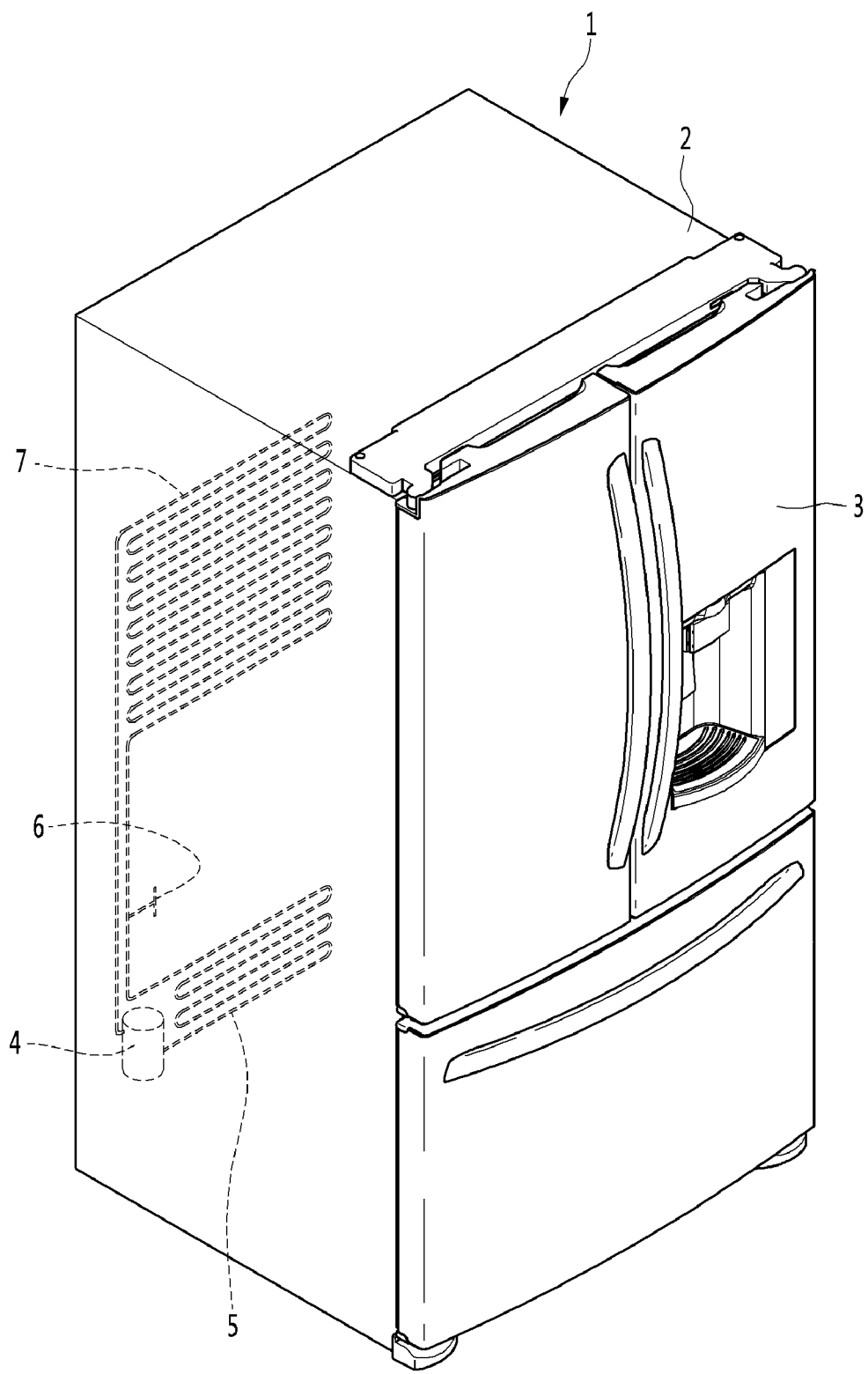
FIG. 1 is a perspective view of a refrigerator according to an embodiment.

Embodiments provide a vacuum adiabatic body in which a spacing member spacing a heat exchange pipeline from a plate by a predetermined distance is easily coupled to the heat exchange pipeline.

Embodiments also provide a vacuum adiabatic body in which, when the heat exchange pipeline is supported to be spaced apart from the plate, contact between the spacing member and the plate is minimized to minimize an adiabatic loss due to thermal conductivity.

Embodiments also provide a vacuum adiabatic body in which a spacing member is installed at a required position, and then, the installed position is permanently fixed.

Technical Solution

In one embodiment, a vacuum adiabatic body may include a supporting unit or support configured to maintain a third space that is a vacuum space and a pipeline provided in the third space. Horizontal movement of the pipeline is restricted by the supporting unit. The pipeline through which a refrigerant flows may be well supported in an internal space of the vacuum adiabatic body.

The supporting unit of the main body-side vacuum adiabatic body, which is applied to a refrigerator according to an embodiment, may include a bar configured to maintain contraction between plate members, and a support plate configured to support the bar. To restrict movement of the heat exchange pipeline through which the refrigerant flows, a supporting part configured to accommodate the heat exchange pipeline therein and at least one wing extending from the supporting part and supported by the bar may be provided in the supporting unit. The heat exchange pipeline may be stably provided in the vacuum adiabatic body without contacting and interfering with other components.

A heat resistance unit or assembly may resist heat transfer between the plate members and include a sheet that may define an outer wall of the vacuum adiabatic body. The heat resistance unit may include a conductive resistance sheet that resists conduction of heat transferred along a wall of the third space and may further include a side frame coupled to the conductive resistance sheet.

The heat resistance unit may include at least one radiation resistance sheet that is provided in a plate shape within the third space or may include a porous material that resists radiation heat transfer between the second plate member and the first plate member within the third space.

Advantageous Effects

According to the embodiment, since the worker directly installs the spacing member at the set position without first inserting the distal end of the heat exchange pipeline in the spacer, the assembly workability or installation may be convenient.

According to the embodiment, the number of indirect contact points between the heat exchange pipeline and the plate may be minimized to reduce the adiabatic loss of the vacuum adiabatic body.

According to the embodiment, the spacing member may be permanently fixed to the set position according to the design factors of the vacuum adiabatic body to improve the reliability of the product because an additional process is not required.

According to the embodiment, when the spacing member is additionally required by the unexpected deformation of the heat exchange pipeline made of the material such as copper, the spacing member may be conveniently installed to improve the yield of the good products.

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings shown below may be displayed differently from the actual product, or exaggerated or simple or detailed parts may be deleted, but this is intended to facilitate understanding of the technical idea of the present invention. It should not be construed as limited.

Also, the number of each of the components illustrated together with the drawings facilitates the understanding of the inventive concept by assigning the same or similar number to the same or similar component in function. Similarly, in the case of performing the same or similar function in function even if the embodiments are different, the same or similar number is assigned to facilitate the understanding of the invention.

In the following description, the vacuum pressure means any pressure state lower than the atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 may include a main body 2 provided with a cavity 9 capable of storing storage goods and a door 3 provided to open or close the main body 2. The door 3 may be rotatably or slidably movably provided to open or close the cavity 9. The cavity 9 may provide at least one of a refrigerating compartment or a freezing compartment.

The cavity 9 may be supplied with parts or devices of a refrigeration or a freezing cycle in which cold air is supplied into the cavity 9. For example, the parts may include a compressor to compress a refrigerant, a condenser to condense the compressed refrigerant, an expander to expand the condensed refrigerant, and an evaporator to evaporate the expanded refrigerant to take heat. As a typical structure, a fan may be installed at a position adjacent to the evaporator, and a fluid blown from the fan may pass through the evaporator and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Figure 2:
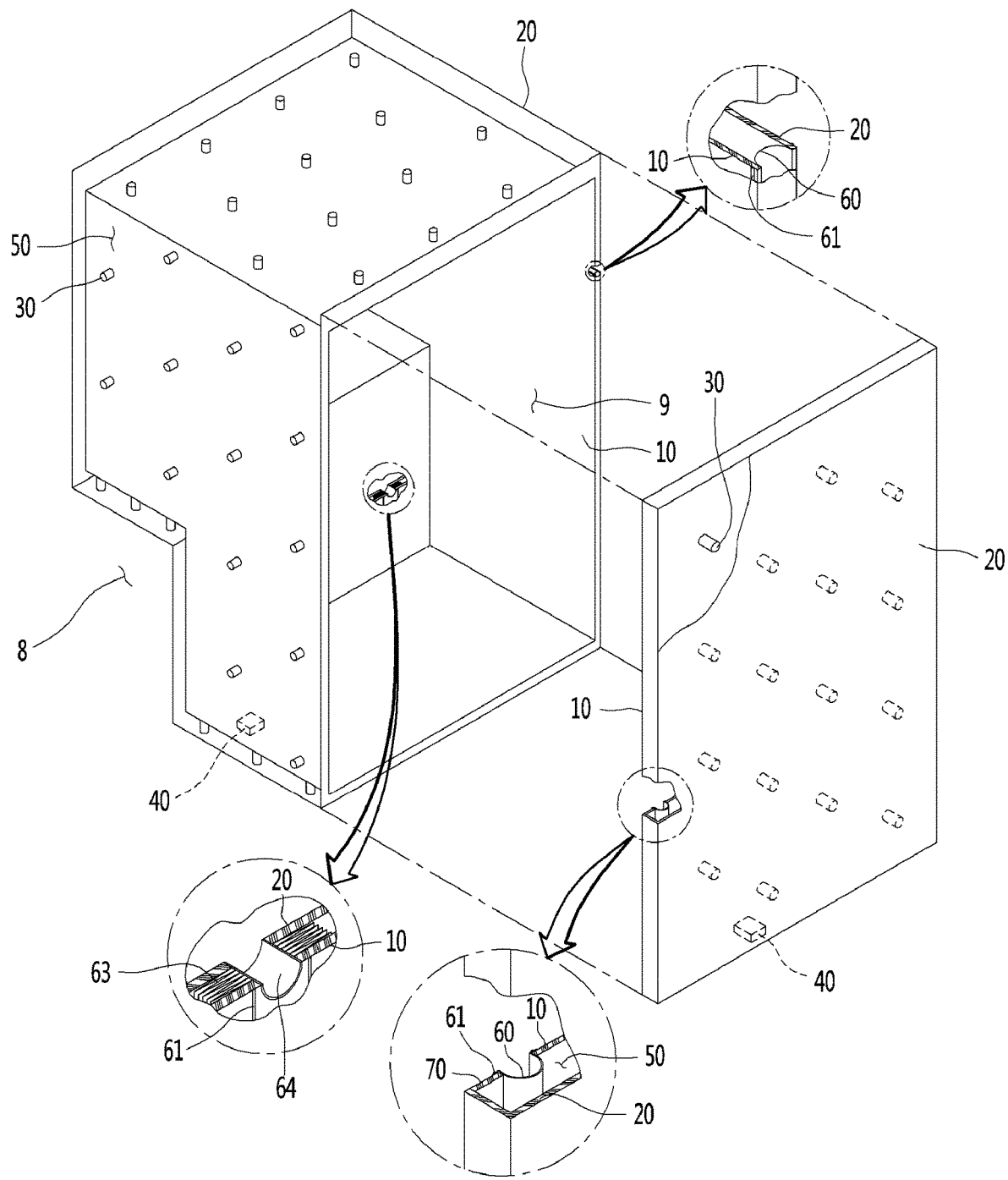
FIG. 2 is a schematic view illustrating a vacuum adiabatic body used in a main body and a door of the refrigerator.

FIG. 2 is a view schematically showing a vacuum adiabatic body used in the main body 2 and the door 3 of the refrigerator 1. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets 60 or 63 are provided are schematically illustrated for convenience of understanding.

Referring to FIG. 2, the vacuum adiabatic body may include a first plate member 10 to provide a wall of a low-temperature space or a first space, a second plate member 20 to provide a wall of a high-temperature space or a second space, and a vacuum space part or a third space 50 defined as a gap between the first and second plate members 10 and 20. Also, the vacuum adiabatic body includes the conductive resistance sheets 60 and 63 to prevent thermal or heat conduction between the first and second plate members 10 and 20. A sealing or welding part 61 may seal the conductive resistance sheets 60 and 63 to the first and second plate members 10 and 20 such that the vacuum space part 50 is in a sealed or vacuum state.

When the vacuum adiabatic body is applied to a refrigerator or a warming apparatus, the first plate member 10 providing a wall of an inner space of the refrigerator may be referred to as an inner case, and the second plate member 20 providing a wall of an outer space of the refrigerator may be referred to as an outer case.

A machine room 8 may include parts providing a refrigerating or a freezing cycle. The machine room may be placed at a lower rear side of the main body-side vacuum adiabatic body, and an exhaust port 40 to form a vacuum state by exhausting air from the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are thermal or heat conduction between the first and second plate members 10 and 20, heat radiation between the first and second plate members 10 and 20, and gas conduction of the vacuum space part 50.

Hereinafter, a heat resistance unit or assembly provided to reduce adiabatic loss related to the factors of the heat transfer will be provided. The vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

The heat resistance unit may include a conductive resistance sheet 60 or 63 that resists conduction of heat transferred along a wall of a third space 50 and may further include a side frame coupled to the conductive resistance sheet. The conductive resistance sheet 60 or 63 and the side frame will be clarified by the following description.

Also, the heat resistance unit may include at least one radiation resistance sheet 32 that is provided in a plate shape within the third space 50 or may include a porous material that resists radiation heat transfer between the second plate member 20 and the first plate member 10 within the third space 50. The radiation resistance sheet 32 and the porous material will be clarified by the following description.

Figure 3A:
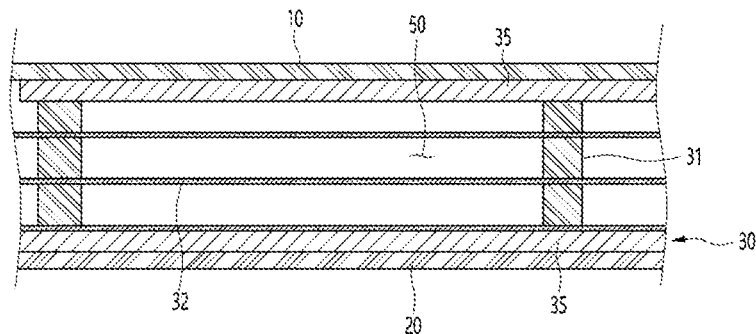
FIGS. 3A-3C are views illustrating various embodiments of an internal configuration of a vacuum space part.
Figure 3B:
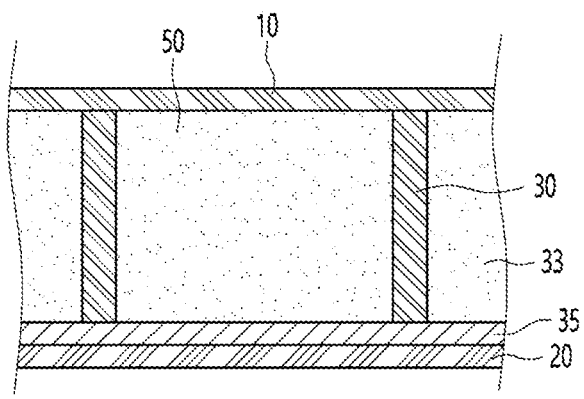
Figure 3C:
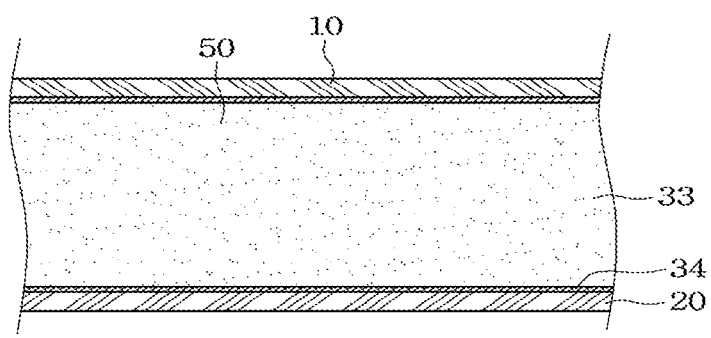

FIGS. 3A-3C are views illustrating various embodiments of an internal configuration of the vacuum space part or third space 50.

First, referring to FIG. 3A, the vacuum space part 50 may have a pressure different from that of each of the first and second spaces, preferably, a vacuum state, thereby reducing an adiabatic loss. The vacuum space part 50 may be provided at a temperature between the temperature of the first space and the temperature of the second space. Since the vacuum space part 50 is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which a distance between the plate members is reduced. In this case, the adiabatic loss may be caused due to an increase in amount of heat radiation, caused by the contraction of the vacuum space part 50, and an increase in amount of thermal or heat conduction, caused by contact between the plate members 10 and 20.

The supporting unit or support 30 may be provided to reduce deformation of the vacuum space part 50. The supporting unit 30 includes a bar 31. The bar 31 may extend in a substantially vertical direction with respect to the plate members 10 and 20 to support a distance between the first plate member 10 and the second plate member 20. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 will be described.

The supporting unit 30 may have a high compressive strength so as to endure the vacuum pressure, a low outgassing rate and a low water absorption rate so as to maintain the vacuum state, a low thermal conductivity so as to reduce the heat conduction between the plate members 10 and 20. Also, the supporting unit 30 may have a secure compressive strength at a high temperature so as to endure a high-temperature exhaust process, have an excellent machinability so as to be subjected to molding, and have a low cost for molding. Here, the time required to perform the exhaust process takes about a few days. Hence, the time is reduced, thereby considerably improving fabrication cost and productivity. Therefore, the compressive strength is to be secured at the high temperature because an exhaust speed is increased as a temperature at which the exhaust process is performed becomes higher. The inventor has performed various examinations under the above-described conditions.

First, ceramic or glass has a low outgassing rate and a low water absorption rate, but its machinability is remarkably lowered. Hence, ceramic and glass may not be used as the material of the supporting unit 30. Resin may be considered as the material of the supporting unit 30.

FIG. 4 is a diagram illustrating results obtained by examining resins.

Referring to FIG. 4, the present inventor has examined various resins, and most of the resins may not be used because their outgassing rates and water absorption rates are remarkably high. Accordingly, the present inventor has examined resins that approximately satisfy conditions of the outgassing rate and the water absorption rate. As a result, polyethylene (PE) may not be used due to its high outgassing rate and its low compressive strength. Polychlorotrifluoroethylene (PCTFE) may not be used due to its remarkably high price. Polyether ether ketone PEEK may not be used due to its high outgassing rate. A resin selected from the group consisting of polycarbonate (PC), glass fiber PC, low outgassing PC, polyphenylene sulfide (PPS), and liquid crystal polymer (LCP) may be used as the material of the supporting unit 30. However, an outgassing rate of PC is 0.19, which is at a low level. Hence, as the time required to perform baking in which exhaustion is performed by applying heat is increased to a certain level, PC may be used as the material of the supporting unit 30.

The present inventor has found an optimal material by performing various studies on resins expected to be used inside the vacuum space part 50. Hereinafter, results of the performed studies will be described with reference to the accompanying drawings.

Figure 5:
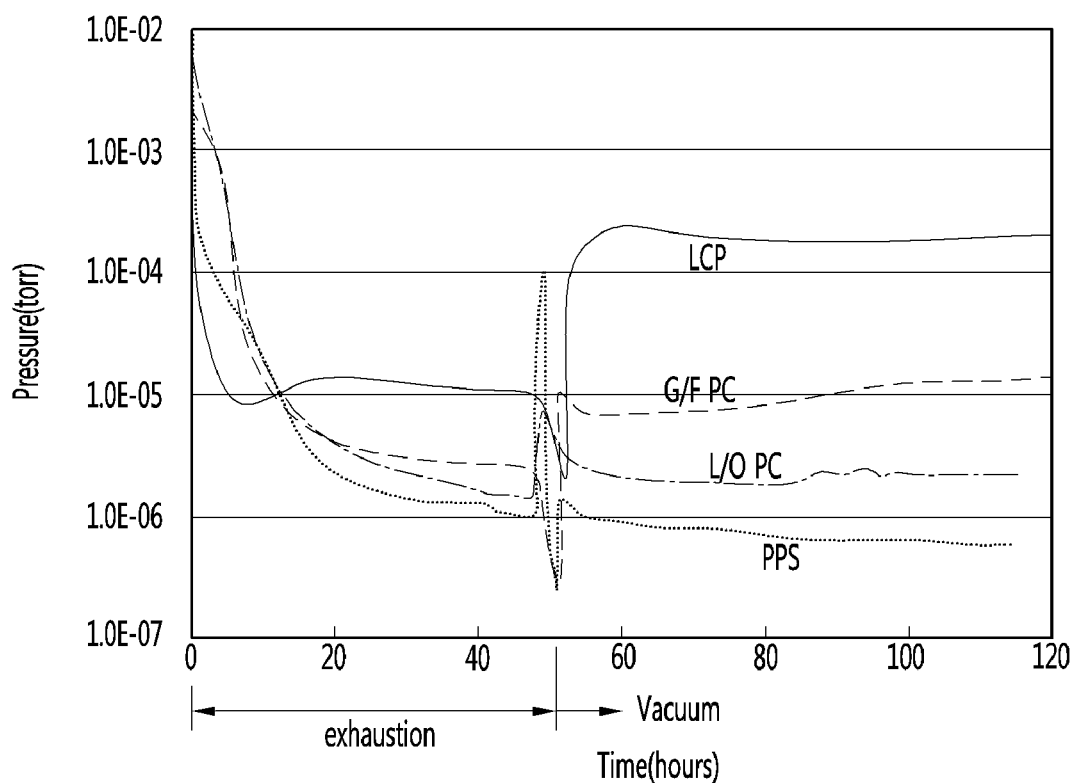
FIG. 5 illustrates results obtained by performing an experiment on vacuum maintenance performances of resins.

FIG. 5 is a view illustrating results obtained by performing an experiment on vacuum maintenance performances of the resins.

Referring to FIG. 5, there is illustrated a graph showing results obtained by fabricating the supporting unit 30 using the respective resins and then testing vacuum maintenance performances of the resins. First, a supporting unit 30 fabricated using a selected material was cleaned using ethanol, left at a low pressure for 48 hours, exposed to the air for 2.5 hours, and then subjected to an exhaust process at 90° C. for about 50 hours in a state where the supporting unit 30 was put in the vacuum adiabatic body, thereby measuring a vacuum maintenance performance of the supporting unit 30.

An initial exhaust performance of LCP is best, but its vacuum maintenance performance is bad. This may be caused by sensitivity of the LCP to temperature. Also, it is expected through characteristics of the graph that, when a final allowable pressure is $5\times10^{-3}$ Torr, its vacuum performance will be maintained for a time of about 0.5 years. Therefore, the LCP may not be used as the material of the supporting unit 30.

Regarding glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance under the same conditions for a time of about 8.2 years. Therefore, PC (G/F PC) may not be used as the material of the supporting unit 30.

It is expected that, in the case of the low outgassing PC (O/G PC), its vacuum maintenance performance is excellent, and its vacuum performance will be maintained under the same conditions for a time of about 34 years, as compared with the above-described two materials. However, it may be seen that the initial exhaust performance of the low outgassing PC is low, and therefore, the fabrication efficiency of the low outgassing PC is lowered.

It may be seen that, in the case of the PPS, its vacuum maintenance performance is remarkably excellent, and its exhaust performance is also excellent. Based on the vacuum maintenance performance, PPS may be used as the material of the supporting unit 30.

Figure 6A:
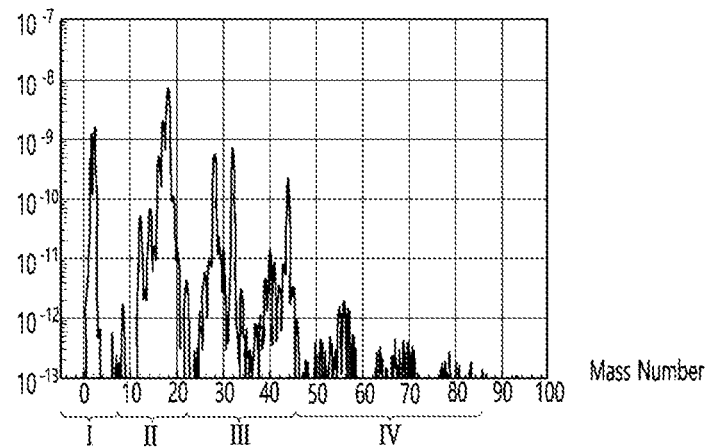
FIGS. 6A-6C illustrate results obtained by analyzing components of gases discharged from a PPS and a low outgassing PC.
Figure 6B:
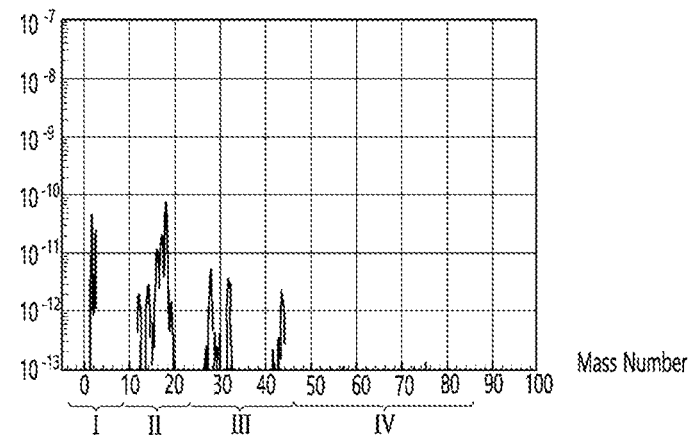
Figure 6C:
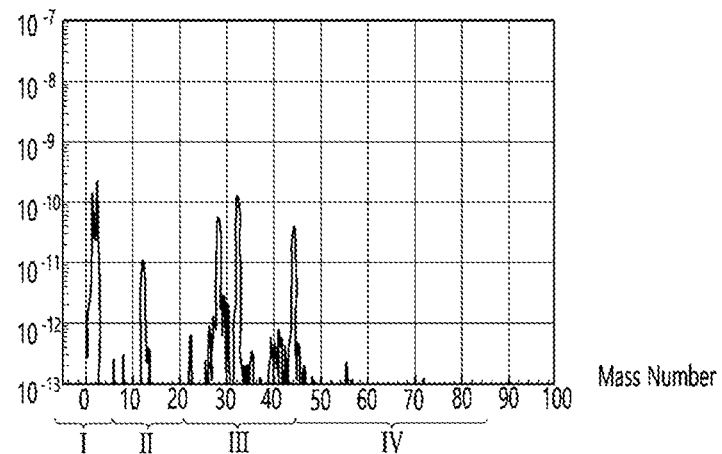

FIGS. 6A-6C illustrate results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that hydrogen or $H_2$ series (I), water or $H_2O$ series (II), dinitrogen/carbon monoxide/carbon dioxide/oxygen or $N_2/CO/CO_2/O_2$ series (111), and hydrocarbon series (IV) are equally discharged. FIG. 6B illustrates a result obtained by analyzing a gas discharged from the PPS. In FIG. 6B, it may be seen that the $H_2$ series (I), $H_2O$ series (II), and $N_2/CO/CO_2/O_2$ series (Ill) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel.

As the analyzed result, it may be re-confirmed that the PPS is excellent as the material of the supporting unit 30.

To further reinforce the strength of the supporting unit 30, a material added with glass fiber (G/F) of several tens %, preferably, G/F of 40% together with the PPS may be used. To better increase strength of a PPS+G/F 40% material used in the supporting unit 30, the PPS+G/F 40% material may be further subjected to a crystallization process (left under an atmosphere of 150° C. or more for about 1 hour) as a post-treatment process after injection.

Figure 7:
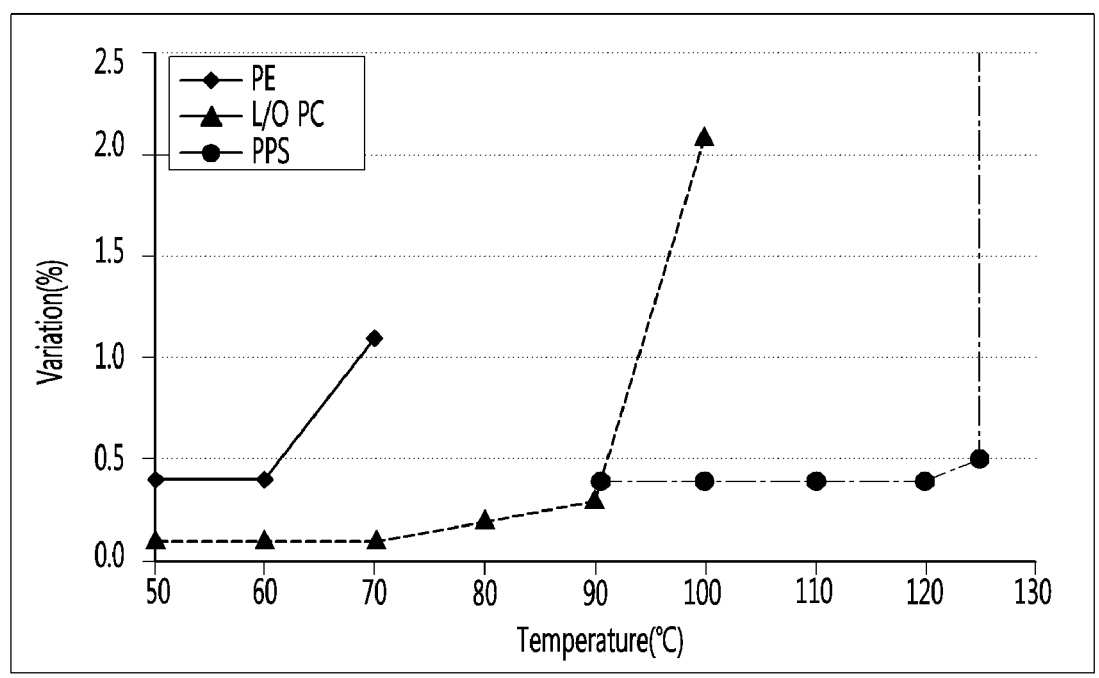
FIG. 7 illustrates results obtained by measuring maximum deformation temperatures at which resins are damaged by atmospheric pressure in high-temperature exhaustion.

FIG. 7 illustrates results obtained by measuring maximum deformation temperatures at which resins are damaged by atmospheric pressure in high-temperature exhaustion. At this time, the bars 31 were provided at a diameter of 2 mm at a distance of 30 mm. Referring to FIG. 7, it may be seen that a rupture occurs at 60° C. in the case of the PE, a rupture occurs at 90° C. in the case of the low outgassing PC, and a rupture occurs at 125° C. in the case of the PPS.

As the analyzed result, it may be seen that the PPS may be used as the resin used inside the vacuum space part 50. However, the low outgassing PC may be used in terms of fabrication cost.

Referring back to FIG. 3A, a radiation resistance sheet 32 to reduce heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet 32, at least two radiation resistance sheets 32 may be provided at a certain distance so as not to contact each other. Also, at least one radiation resistance sheet 32 may be provided in a state in which it contacts the inner surface of the first or second plate member 10 or 20.

Referring to FIG. 3B, the distance between the plate members 10 and 20 is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In the present embodiment, the vacuum adiabatic body may be manufactured without the radiation resistance sheet 32.

Referring to FIG. 3C, the supporting unit 30 to maintain the vacuum space part 50 may not be provided. A porous material 333 may be provided to be surrounded by a film 34 instead of the supporting unit 30. Here, the porous material 33 may be provided in a state of being compressed so that the gap of the vacuum space part 50 is maintained. The film 34 made of, for example, a PE material provided in a state in which a hole is punched in the film 34.

In the present embodiment, the vacuum adiabatic body may be manufactured without the supporting unit 30. That is to say, the porous material 33 may perform the function of the radiation resistance sheet 32 and the function of the supporting unit 30 together.

Figure 8A:
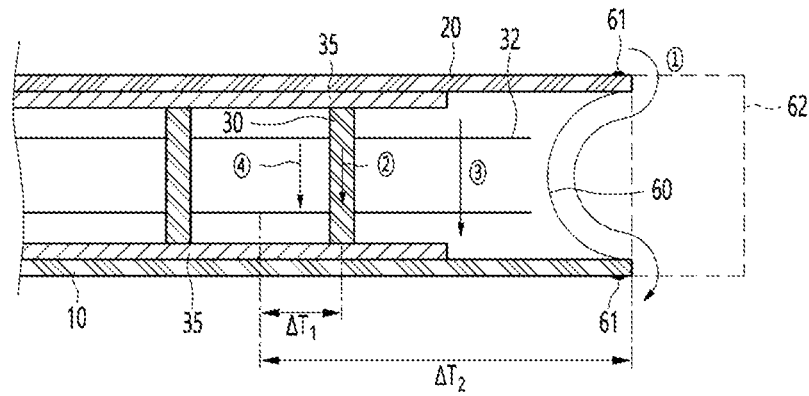
FIGS. 8A-8C are views showing various embodiments of conductive resistance sheets and peripheral parts thereof.
Figure 8B:
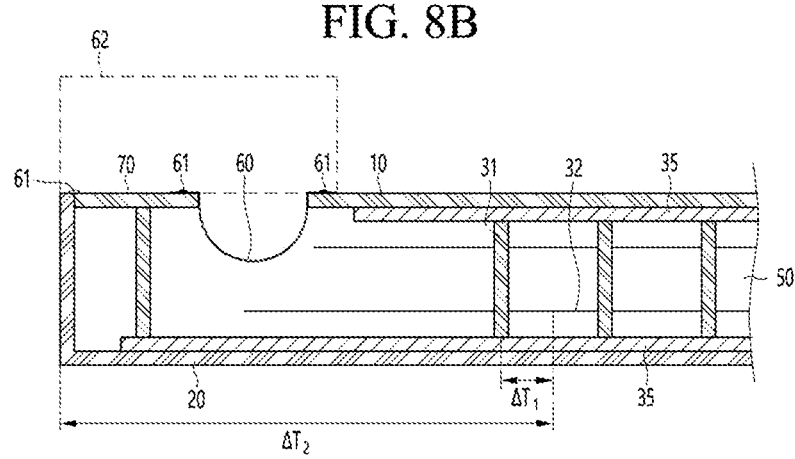
Figure 8C:
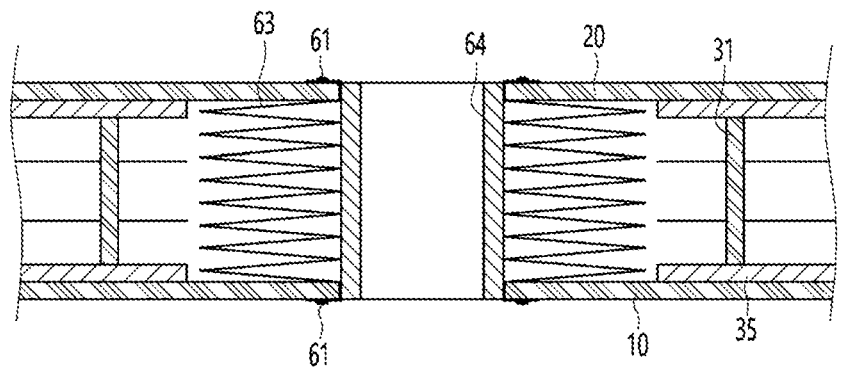

FIGS. 8A-8C are views showing various embodiments of conductive resistance sheets 60 or 63 and peripheral parts thereof. Structures of the conductive resistance sheets 60 or 63 are briefly illustrated in FIG. 2, but will be understood in detail with reference to the drawings.

First, a conductive resistance sheet 60 proposed in FIG. 8A may be applied to the main body-side vacuum adiabatic body. Specifically, the first and second plate members 10 and 20 may be sealed so as to vacuumize the interior of the vacuum adiabatic body. In this case, since the first and second plate members 10 and 20 have different temperatures from each other, heat transfer may occur between the first and second plate members 10 and 20. A conductive resistance sheet 60 is provided to prevent thermal or heat conduction between two different kinds of plate members 10 and 20.

The conductive resistance sheet 60 may be provided with sealing or welding parts 61 at which both ends of the conductive resistance sheet 60 are sealed to define at least one portion of the wall for the third space or vacuum space part 50 and maintain the vacuum state. The conductive resistance sheet 60 may be provided as a thin foil in unit of micrometer so as to reduce the amount of heat conducted along the wall for the vacuum space part 50. The sealing part 61 may be provided as welding parts, and the conductive resistance sheet 60 and the plate members 10 and 20 may be fused to each other. In order to cause a fusing action between the conductive resistance sheet 60 and the first and second plate members 10 and 20, the conductive resistance sheet 60 and the first and second plate members 10 and 20 may be made of the same material (e.g., a stainless material). The sealing part 61 is not limited to the welding part, and may be provided through a process such as cocking. The conductive resistance sheet 60 may be provided in a curved shape. Thus, a thermal or heat conduction distance of the conductive resistance sheet 60 is provided longer than the linear distance of each plate member 10 and 20, so that the amount of thermal or heat conduction may be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the refrigerator 1, the second plate member 20 has a high temperature and the first plate member 10 has a low temperature. In addition, thermal or heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 may not serve as a conductive resistor at the exposed portion.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body 2 and the door 3 are opened, the shielding part 62 may be provided as a porous material or a separate adiabatic structure.

A conductive resistance sheet 60 proposed in FIG. 8B may be applied to the door-side vacuum adiabatic body. In FIG. 8B, portions different from those of FIG. 8A are described in detail, and the same description is applied to portions identical to those of FIG. 8A. A side frame 70 is further provided at an outside of the conductive resistance sheet 60. A part or seal to seal between the door 3 and the main body 2, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part 50, i.e., a corner side portion of the vacuum space part 50. This is because, unlike the main body 2, a corner edge portion of the door 3 is exposed to the exterior. More specifically, if the conductive resistance sheet 60 is placed at the front end portion of the vacuum space part 50, the corner edge portion of the door 3 is exposed to the exterior, and hence there is a disadvantage in that a separate adiabatic part should be configured so as to heat-insulate the conductive resistance sheet 60.

A conductive resistance sheet 63 proposed in FIG. 8C may be installed in the pipeline 64 passing through the vacuum space part 50. In FIG. 8C, portions different from those of FIGS. 8A and 8b are described in detail, and the same description is applied to portions identical to those of FIGS. 8A and 8B. A conductive resistance sheet 63 having a similar shape as that of FIG. 8A, such as a wrinkled or zig-zag conductive resistance sheet 63, may be provided at a peripheral portion of the pipeline 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 8A. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the first and second plate members 10 and 20 may be changed, and the length of the conductive resistance sheet 60 or 63 may be changed. The transfer heat may be changed depending on a difference in temperature between the spaces (the first and second spaces) respectively provided by the plate members 10 and 20. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become the smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is the largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK_{solid\ conduction\ heat} > eK_{radiation\ transfer\ heat} > eK_{gas\ conduction\ heat} \quad \text{Equation 1}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area ($m^2$) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet 60 or 63, and a thermal conductivity (k) of the conductive resistance sheet 60 or 63 (the thermal conductivity of the conductive resistance sheet is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, an amount, and the like of the porous material.

According to an embodiment, a temperature difference $\Delta T_1$ between a geometric center formed by adjacent bars 31 and a point at which each of the bars 31 is located may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate member 20 and a temperature at a point at which a heat transfer path passing through the conductive resistance sheet 60 or 63 meets the second plate member 20 may be the largest. For example, when the second space is a region hotter than the first space, the temperature at the point at which the heat transfer path passing through the conductive resistance sheet 60 or 63 meets the second plate member 20 becomes lowest. Similarly, when the second space is a region colder than the first space, the temperature at the point at which the heat transfer path passing through the conductive resistance sheet 60 or 63 meets the second plate member 20 becomes highest.

This means that the amount of heat transferred through other points except the surface conduction heat passing through the conductive resistance sheet 60 or 63 should be controlled, and the entire heat transfer amount satisfying the vacuum adiabatic body may be achieved only when the surface conduction heat occupies the largest heat transfer amount. To this end, a temperature variation of the conductive resistance sheet 60 or 63 may be controlled to be larger than that of the plate members 10 and 20.

Physical characteristics of the parts constituting the vacuum adiabatic body will be described. In the vacuum adiabatic body, a force by vacuum pressure is applied to all of the parts. Therefore, a material having a strength (N/m$^2$) of a certain level may be preferably used.

Under such conditions, the plate members 10 and 20 and the side frame 70 may be made of a material having a sufficient strength with which they are not damaged by even vacuum pressure. For example, when the number of bars 31 is decreased so as to limit the support conduction heat, deformation of the plate members 10 and 20 may occur due to the vacuum pressure, which may bad influence on the external appearance of refrigerator. The radiation resistance sheet 32 may be made of a material that has a low emissivity and may be easily subjected to thin film processing. Also, the radiation resistance sheet 32 is to ensure a strength strong enough not to be deformed by an external impact. The supporting unit 30 is provided with a strength strong enough to support the force by the vacuum pressure and endure an external impact, and is to have machinability. The conductive resistance sheet 60 may be made of a material that has a thin plate shape and may endure the vacuum pressure.

In an embodiment, the plate members 10 and 20, the side frame 70, and the conductive resistance sheet 60 or 63 may be made of stainless materials having the same strength. The radiation resistance sheet 32 may be made of aluminum having a weaker strength that the stainless materials. The supporting unit 30 may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a high or predetermined strength, but the stiffness of the material may be low so as to increase heat resistance and minimize radiation heat as the conductive resistance sheet 60 or 63 is uniformly spread without any roughness when the vacuum pressure is applied. The radiation resistance sheet 32 requires a stiffness of a certain level so as not to contact another part due to deformation. Particularly, an edge portion of the radiation resistance sheet 32 may generate conduction heat due to drooping caused by the self-load of the radiation resistance sheet 32. Therefore, a stiffness of a certain level is required. The supporting unit 30 may require a stiffness strong enough to endure a compressive stress from the plate members 10 and 20 and an external impact.

In an embodiment, the plate members 10 and 20 and the side frame 70 may have the highest stiffness so as to prevent deformation caused by the vacuum pressure. The supporting unit 30, particularly, the bar 31 may have the second highest stiffness. The radiation resistance sheet 32 may have a stiffness that is lower than that of the supporting unit 30 but higher than that of the conductive resistance sheet 60 or 63. Lastly, the conductive resistance sheet 60 or 63 may be made of a material that is easily deformed by the vacuum pressure and has the lowest stiffness.

Even when the porous material 33 is filled in the vacuum space part 50, the conductive resistance sheet 60 or 63 may have the lowest stiffness, and the plate members 10 and 20 and the side frame 70 may have the highest stiffness.

The vacuum space part 50 may resist heat transfer by only the supporting unit 30. Here, a porous material 33 may be filled with the supporting unit 30 inside the vacuum space part 50 to resist to the heat transfer. The heat transfer to the porous material 33 may resist without applying the supporting unit 30.

In the above description, as a material suitable for the supporting unit 30, a resin of PPS has been proposed. The bar 31 is provided on the support plate 35 at gaps of 2 cm to 3 cm, and the bar 31 has a height of 1 cm to 2 cm. These resins often have poor fluidity of the resin during the molding. In many cases, the molded article does not have the designed value. Particularly, the shape of a molded product such as a bar 31 having a short length is often not provided properly due to non-uniform injection of resin into a part far from the liquid injection port of the liquid.

This may cause damage of the supporting unit 30 or a defective vacuum adiabatic body later.

The supporting unit 30 is a substantially two-dimensional structure, but its area is considerably large. Therefore, if a defect occurs in one of the portions, it is difficult to discard the entire structure. This limitation becomes even more pronounced as refrigerators and warming apparatus are becoming larger in size to meet the needs of consumers.

Figure 9:
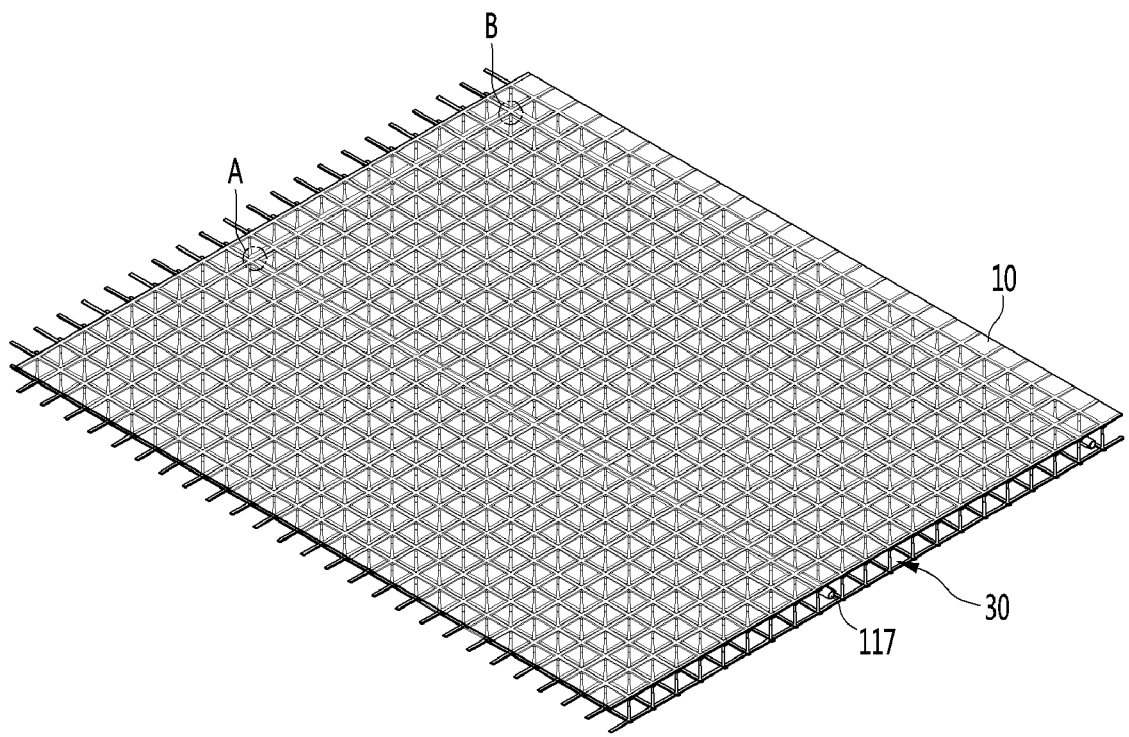
FIG. 9 is a partial cutaway view of the vacuum adiabatic body.
Figure 10:
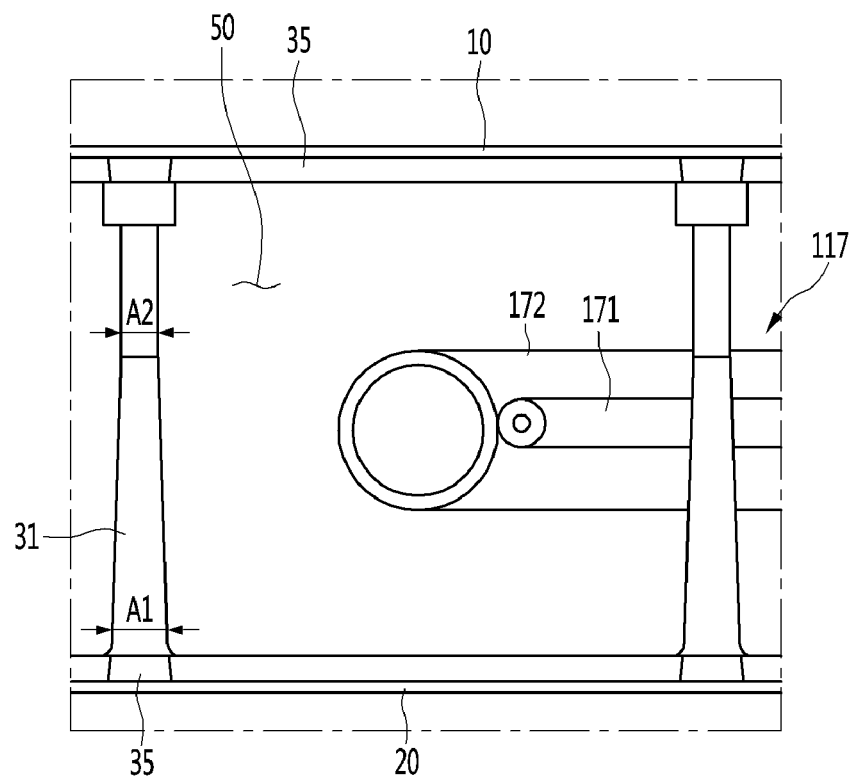
FIG. 10 is a view illustrating a state in which a heat exchange pipeline is provided in the vacuum space part.

Referring to FIGS. 9 and 10, a heat exchange pipeline 117 may be provided in the internal space of the vacuum adiabatic body, i.e., the vacuum space part 50. The heat exchange pipeline 117 may be provided by allowing an inlet pipe 171 through which the refrigerant is introduced into an evaporator provided in the refrigerator to contact an outlet pipe 172 through which the refrigerant is discharged from the evaporator. Two pipelines that are the inlet pipe 171 and the outlet pipe 172 may be bonded to each other through welding. The refrigerant flowing through the inlet pipe 171 and the outlet pipe 172 may be heat-exchanged with each other to improve efficiency of a refrigeration cycle.

An operation and configuration in a state in which the heat exchange pipeline is provided in the vacuum space part will be described below.

First, an embodiment in which a porous material 33 is filled into the third space 50 as illustrated in FIGS. 3B and 3C will be described. In this case, a heat exchange pipeline 117 may be inserted into the third space, and then, the porous material 33 may be filled into the third space. Here, the porous material 33 may be filled into a region within the third space except for the heat exchange pipeline 117 to improve adiabatic performance. Particularly, in the case of FIG. 3C, the porous material 33 may serve to surround a position of the heat exchange pipeline 117 and also maintain a gap of the third space as the supporting unit 30.

Alternatively, when the porous material 33 is processed into an object having a predetermined shape at the outside, the porous material 33 and the heat exchange pipeline 117 may be provided first as a single body. Thereafter, the single body of the porous material 33 and the heat exchange pipeline 117 may be inserted into the third space.

In the case of FIG. 3B, the vacuum space part 50 may fix a position of the heat exchange pipeline and the supporting unit 30. The supporting unit 30 including the bar 31 may be separately provided.

Hereinafter, as illustrated in FIGS. 3A and 3B, an operation and configuration of the heat exchange pipeline 117 in the vacuum space part 50 will be described as an embodiment that is preferably applied to when the supporting unit 30 including the bar 31 is provided.

FIG. 9 is a partial cutaway view of the vacuum adiabatic body, and FIG. 10 is a view illustrating a state in which the heat exchange pipeline 117 is provided in the vacuum space part 50.

Each of the bars 31 may have a conical or tapered shape such that a lower portion may have a greater cross-sectional area A1 than a cross-sectional area A2 of an upper portion thereof in the drawing. As a result, high molding processability may be secured.

The heat exchange pipeline 117 may avoid contact with other members in the vacuum space part 50 as much as possible. When a pipeline made of a metal, for example, copper contacts the other member, heat exchange efficiency may be deteriorated due to thermal conduction, and thus, the adiabatic performance may not be realized. Particularly, the bonding between the metals of the plate member 10 and/or 20 and the heat exchange pipeline 117 may cause a sharp or quick heat loss or transfer.

The heat exchange pipeline 117 may be provided so as not to contact any plate member 10 or 20 and/or the supporting unit at a gap between the bars 31 in the horizontal direction in the vacuum space part 50 between the plate members 10 and 20 in the vertical direction. Thus, the occurrence of the heat loss or transfer due to the contact between the heat exchange pipeline 117 and the plate members 10 and 20 may be prevented.

The heat exchange pipeline 117 may be made of a material having relatively low rigidity, for example, copper. Thus, the heat exchange pipeline 117 may be weak against an external impact or force. When the heat exchange pipeline 117 is bent, any unintentional force in one direction may lead to deformation of the heat exchange pipeline 117 to cause contact with the internal component of the vacuum space part 50. This limitation may also be caused by an external impact. Thus, the heat exchange pipeline 117 may be supported by a guide member.

To guide the heat exchange pipeline 117 so as to be spaced apart from plate members 10 and 20 and/or the supporting unit 30, a spacing member is provided in the vacuum space part 50. The spacing member may be provided on a bent portion or section at the entire position of the heat exchange pipeline 117. The bent portion may correspond to each of areas A and B of FIG. 9.

Hereinafter, the spacing member will be described.

Figure 11:
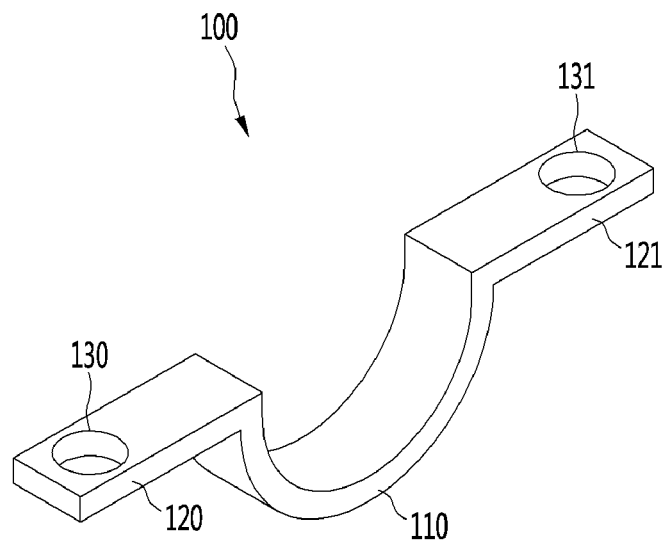
FIG. 11 is a perspective view of a one-way spacing member that is one kind of spacing members.

FIG. 11 is a perspective view of a one-way spacing member that is one kind of spacing members.

Referring to FIG. 11, a one-way spacing member or spacer 100 includes a supporting part or guide 110 and wings 120 and 121. The supporting part 110 may be smoothly recessed in one direction and configured to accommodate the heat exchange pipeline 117 to restrict movement of the heat exchange pipeline 117 in one direction. The wings 120 and 121 may extend from both end portions of the supporting part 110. Insertion holes 130 and 131 into which the bar 31 is inserted may be provided in the wings 120 and 121, respectively. The supporting part 110 may alternatively be referred to as a main body of the spacing member 100.

The supporting part 110 may have a smoothly bent cross-sectional shape and/or be curved so as to correspond to an outer surface of the heat exchange pipeline 117. As a result, a downward movement of the heat exchange pipeline 117 may be restricted by the supporting part 110. In addition, high moldability may be secured.

The supporting part 110 may restrict the movement of the heat exchange pipeline 117 within a predetermined level range in which the heat exchange pipeline 117 moves in left and right directions. Although this case is not frequent in the arrangement state of the heat exchange pipeline 117, the movement of the heat exchange pipeline 117 in upward and downward directions with respect to the drawings may have a great influence on the heat loss or transfer. Thus, it is understood that, since each of the upward and downward directions is defined as one direction, and the left and right directions are directions in which the movement of the heat exchange pipeline 117 does not have a great influence on the heat loss or transfer, the movement of the heat exchange pipeline 117 is restricted in all directions by the spacing members 100.

The wings 120 and 121 may allow the installed position of the supporting part 110 to be supported with respect to the bar 31. For this, the wings 120 and 121 may extend up to a position at which the bar 31 is placed. That is to say, force supporting the heat exchange pipeline 117 may be provided by the bar 31. Alternatively, it may be understood that the supporting force is provided via the supporting part 110 and the wings 120 and 121.

The bar 31 may be inserted into the insertion holes 130 and 131, and the vertical movement of the one-way spacing member 100 may be stopped at a portion at which an inner diameter of each of the insertion holes 130 and 131 match an outer diameter of the bar 31. The bar 31 may have a cross-sectional diameter that gradually increases. Thus, the wings 120 and 121 may be supported between the largest cross-sectional diameter A1 and the smallest cross-sectional diameter A2.

The one-way spacing member 100 of FIG. 11 according to an embodiment may restrict the movement of the heat exchange pipeline 117 at a lower side in the drawings (here, the lower side is defined toward a thick side in the diameter of the bar 31), i.e., the downward movement of the heat exchange pipeline 117.

Figure 12:
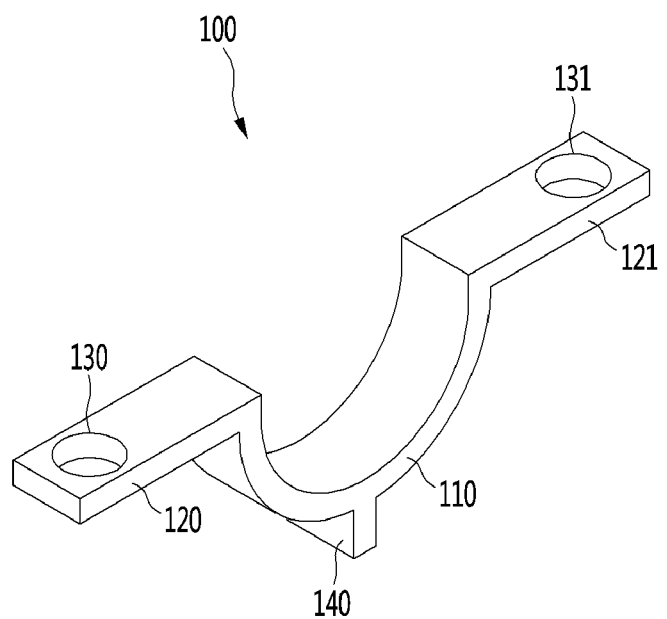
FIG. 12 is a perspective view of a one-way spacing member according to another embodiment.

FIG. 12 is a perspective view of a one-way spacing member 100 according to another embodiment. The spacing member 100 according to this embodiment is substantially the same as that according to the foregoing embodiment except that a supporting protrusion 140 is provided. Thus, the same description as that of FIG. 11 may be equally applied to description of FIG. 12.

Referring to FIG. 12, a supporting protrusion or rib 140 is further provided at the lowest position of a supporting part 110. The supporting protrusion 140 may be used to restrict an excessive movement of the supporting part 110. The supporting protrusion 140 protrudes from the supporting part 110 by a predetermined height. When the heat exchange pipeline 117 pushes the supporting part 110, the supporting part 110 may contact the support plate 35 to restrict the movement of the heat exchange pipeline 117. However, the supporting protrusion 140 may not always contact the support plate 35 and thus act as a factor that causes a conductive heat loss or transfer. When the supporting protrusion 140 is designed, the supporting protrusion 140 may have a shape and length so as not to peripherally contact other members such as the support plate 35 when the spacing member 100 is mounted. Alternatively, if excessively pushed when the heat exchange pipeline 117 is installed, although the supporting protrusion 140 contacts the support plate 35, the space member 100 may be restored by a restoring force thereof to prevent the supporting protrusion 140 from contacting the support plate 35.

Alternatively or in addition thereto to a case where the supporting protrusion 140 is provided, a predetermined support structure may be processed on an outer circumferential surface of the bar 31, or a separate hook member may be provided to further give a hooking operation between the wings 120 and 121 and the bar 31. However, for convenience of description, it may be more convenient to provide the supporting protrusion 140 on a single member. This may be applied to all following embodiments.

The one-way spacing member may be made of a resin that is the same material as the supporting unit 30. For example, when the supporting unit 30 is made of a PPS+G/F 40% material to reinforce strength, the crystallization process may not be applied to the one-way spacing member 100. This object is to obtain an effect of absorbing a predetermined amount of external force applied from the heat exchange pipeline 117 and a restoring force after deformation. The deformation restoring force may be more clearly understood in case of an open-type one-way spacing member that will be described below.

The material of the spacing member 100 may be equally applied to all the following spacing members without further explanation.

Figure 13:
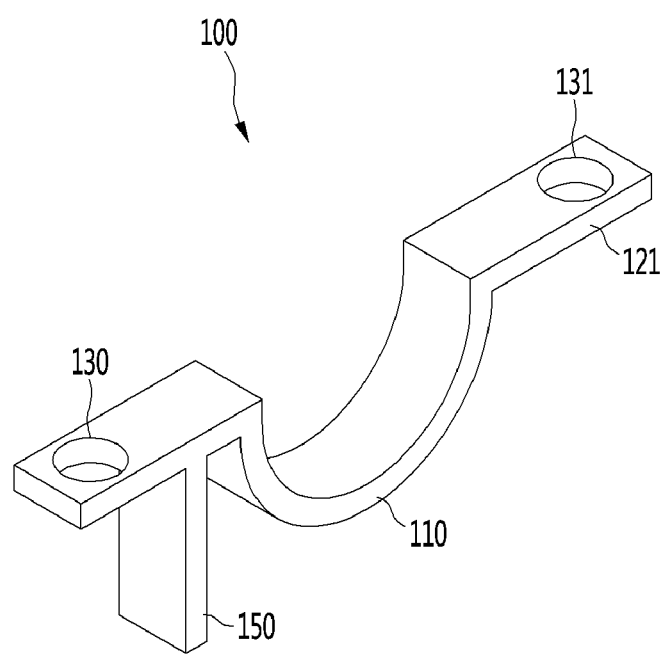
FIG. 13 is a perspective view of a one-way spacing member according to further another embodiment.

An operation of the one-way spacing member 100 will be described with reference to FIGS. 14 and 15. FIG. 13 will be described after FIGS. 13-16.

Figure 14:
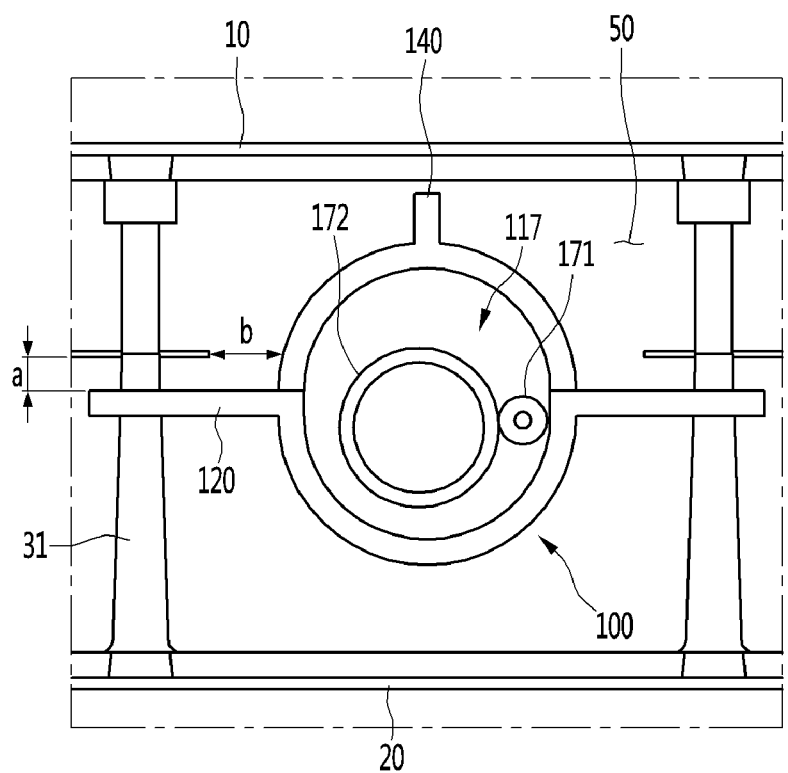
FIG. 14 is a front view illustrating a state in which a pair of one-way spacing members are installed.
Figure 15:
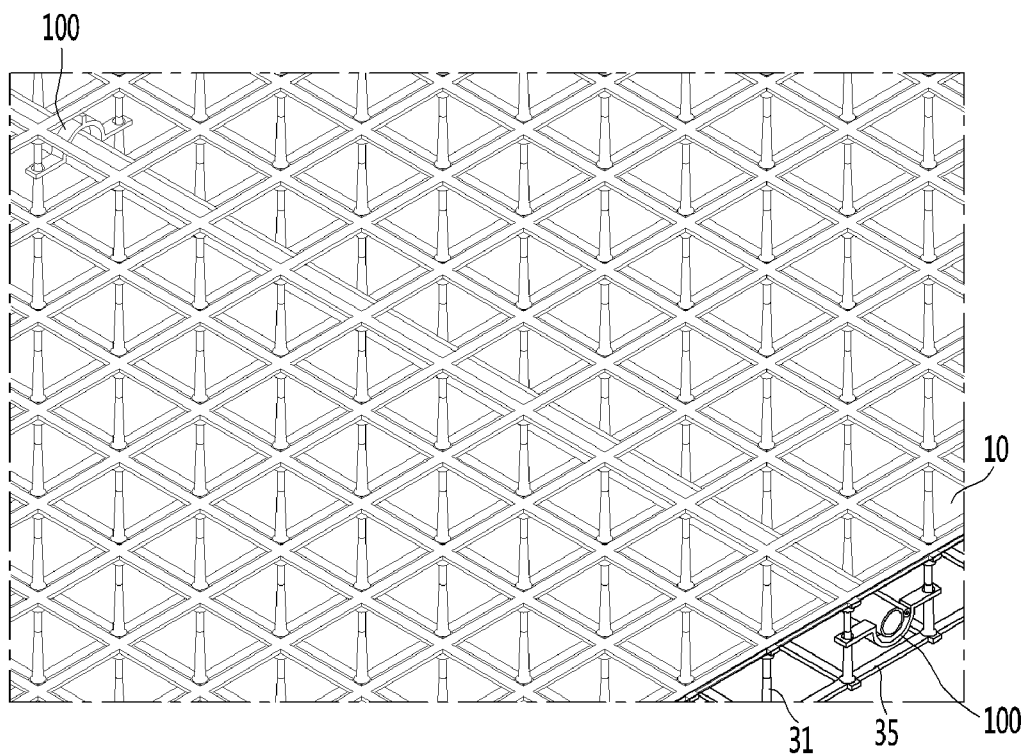
FIG. 15 is a partial cutaway view of the vacuum adiabatic body in a state in which the heat exchange pipeline is installed.

FIG. 14 is a front view illustrating a state in which a pair of one-way spacing members are installed, and FIG. 15 is a partial cutaway view of the vacuum adiabatic body in a state in which the heat exchange pipeline is installed.

In a state in which the pair of one-way spacing members are installed, one one-way spacing member may restrict movement of the heat exchange pipeline in one direction, and the other one-way spacing member may restrict movement of the heat exchange pipeline in another direction.

In more detail, a first one-way spacing member 100, which is provided at a front side in FIGS. 14 and 15, may restrict downward movement of the heat exchange pipeline 117, and a second one-way spacing member 100, which is provided at a rear side, may restrict upward movement of the heat exchange pipeline 117. The first one-way spacing member may be a member in which the supporting protrusion 140 is not provided and restrict the movement of the heat exchange pipeline 117 by an actual supporting operation between the insertion holes 130 and 131 and the bar 31, as the bar 31 may have an increasing diameter in the downward direction. The second one-way spacing member may be a member in which the supporting protrusion 140 is provided. Thus, when pushed by the heat exchange pipeline 117, the supporting protrusion 140 contacts and is supported by the support plate 35, and the second one-way spacing member 100 may restrict additional thermal conduction.

As illustrated in FIG. 15, the one-way spacing member 100 may not support the heat exchange pipeline 117 in all upward and downward directions at one position. That is to say, the downward movement of the heat exchange pipeline 117 may be restricted at one or a first position (e.g., a front position), and the upward movement of the heat exchange pipeline 117 may be restricted at another or a second position (e.g., a rear position) that is spaced apart from the one position.

When the heat exchange pipeline 117 is shaken or moved in the horizontal direction, the supporting part 110 provided in the band or semiring shape may guide the heat exchange pipeline 117 to prevent the heat exchange pipeline 117 and the bar 31 from contacting each other. This may be realized because the bar 31 and the one-way spacing member 100 are fixed in position with respect to each other.

Since the one-way spacing member 100 is made of a non-metal material by using a resin as a base material, it is difficult to manufacture a one-way spacing member having a thin plate shape. Thus, it is difficult to install the one-way spacing member 100 together with a radiation resistance sheet 32 in a space between the supporting units 30. In consideration to the above-described structure, the insertion holes 130 and 131 are provided to surround the bar 31.

The radiation resistance sheet 32 may be further installed in the vacuum space part 50. The radiation resistance sheet 32 may be provided with a cutoff part that is cut so as not to contact the one-way spacing member 100.

In more detail, the one-way spacing member 100 may be supported by the bar 31 but move in at least one direction along the bar 31, which may be the direction in which a cross-sectional area of the bar 31 decreases. As a result, when the radiation resistance sheet 32 and the one-way spacing member 100 are installed to overlap each other, the radiation resistance sheet 32 may be damaged by a movement of the one-way spacing member 100. Thus, the radiation resistance sheet 32 may be cut in a portion of a space in which the one-way spacing member 100 is installed.

The description of the cutoff part of the radiation resistance sheet 32 may be equally applied to the following other spacing members 100 without further explanation. The radiation resistance sheet 32 may not be applied to the vacuum adiabatic body having a low adiabatic load.

Figure 16:
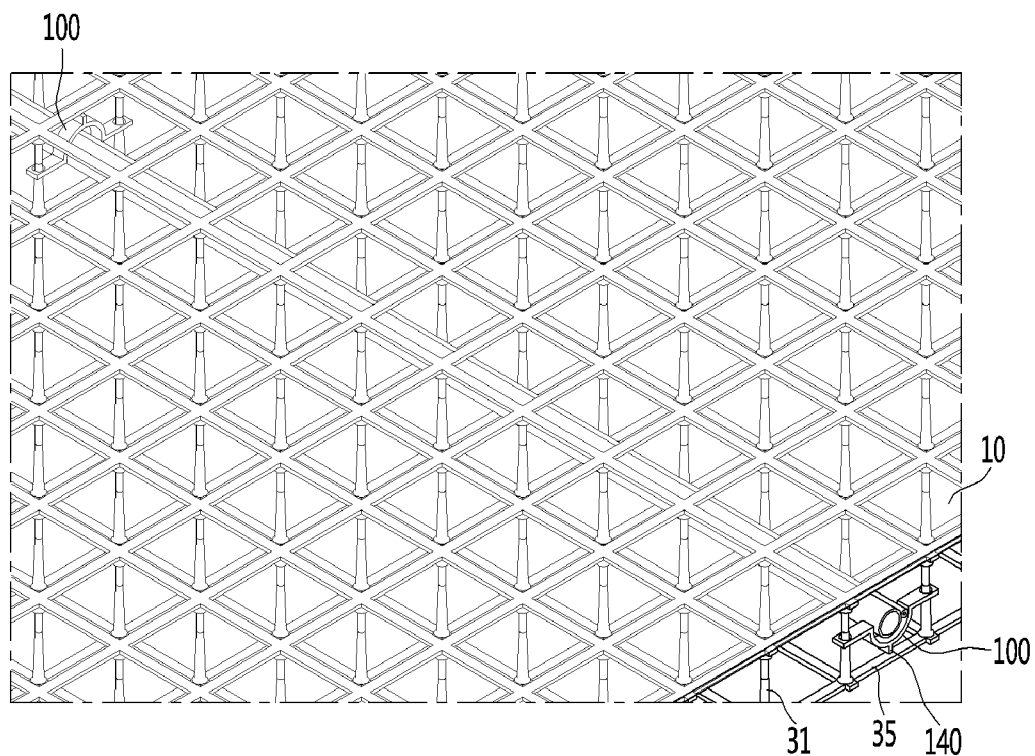
FIG. 16 is a partial cutaway view illustrating another example of the vacuum adiabatic body in the state in which the heat exchange pipeline is installed.

FIG. 16 is a partial cutaway view illustrating another example of the vacuum adiabatic body in the state in which the heat exchange pipeline is installed.

Referring to FIG. 16 the supporting protrusion 140 is provided in each of the first and second one-way spacing members 100 to extend in both the upward and downward directions of the heat exchange pipeline 117. Alternatively, a single spacing member 100 may be provided to have a supporting protrusion 140 extending in both upward and downward directions, and convenience of work or installation may be increased. Even though the one-way spacing member 100 is fixed in position by the relationship between the inner diameter of each of the insertion holes 130 and 131 and the outer diameter of the bar 31, the installation position of the heat exchange pipeline 117 may be more firmly fixed by the supporting protrusion 140.

FIG. 13 is a perspective view of a one-way spacing member 100 according to further another embodiment.

Referring back to FIG. 13, this embodiment is different from the embodiment of FIG. 12 in that a supporting protrusion 150 is not installed at the lowermost point of a supporting part 110 but installed on wings 120 and 121.

In the case of the embodiment of FIG. 13, movement of the supporting part 110 may be restricted to stably maintain an installation position of a heat exchange pipeline 117. Although the supporting protrusion 150 is provided on one side in the drawings, this embodiment is not limited thereto. For example, the supporting protrusion 150 may be provided on each of both wings 120 and 121.

Various methods of installing the one-way spacing member 100 on the vacuum adiabatic body will be described.

A first method is as follows. First, the one-way spacing member 100, the supporting unit 30, and the heat exchange pipeline 117 may be assembled to manufacture an assembly. In a state in which a first plate member 10 and a second plate member 20 are temporarily separated, the assembly is inserted into a gap between the plate members 10 and 20. Thereafter, a third space or the vacuum space part 50 may be sealed from external other spaces (e.g., the first and second spaces), and then, a gas within the third space may be exhausted.

A second method is as follows. First, the one-way spacing member 100, the supporting unit 30, and the heat exchange pipeline 117 may be assembled to manufacture an assembly. The assembly is seated or installed on one plate member 10 or 20, and the other plate member 20 or 10 is coupled to the one plate member 10 or 20. Then, the third space is sealed from the external outer spaces. Then, the gas within the third space may be exhausted.

All the first method and the second method may be methods for manufacturing the assembly and performed as follows. First, the lower or first one-way spacing member 100 may be mounted on a supporting unit 30, and the heat exchange pipeline 117 may be seated on the lower one-way spacing member 100. Then, the upper or second one-way spacing member 100 may be seated on the supporting unit 30.

Figure 17:
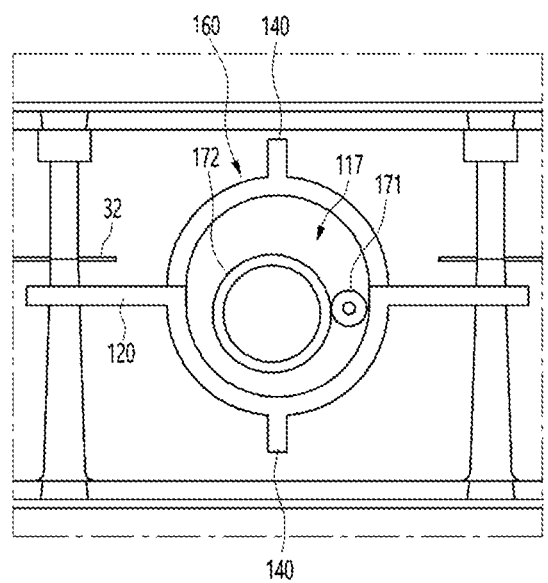
FIG. 17 is view illustrating a use state of a spacing member according to further another embodiment.

FIG. 17 is view illustrating a use state of a spacing member according to further another embodiment. A spacing member according to this embodiment may be a close-type bidirectional spacing member 160. The close-type bidirectional spacing member may be different from the one-way spacing member 100 in that the single spacing member 160 restricts the bidirectional movement of the heat exchange pipeline 117. However, since other explanations are the same as those of FIG. 14, the explanations may be equally applied.

Referring to FIG. 17, the close-type bidirectional spacing member 160 includes a supporting part 110 having a smoothly bent or rounded shape, of which a cross-section has a closed curve (e.g., circular or elliptical) shape, and supporting a heat exchange pipeline 117, wings 120 and 121 extending in both or side directions of the supporting part 110, and a supporting protrusion 140 extending in a vertical direction or both up and down directions.

The heat exchange pipeline 117 may be provided on the close-type bidirectional spacing member 160 to pass through the supporting part 110, and then, the close-type bidirectional spacing member 160 may be supported on the bar 31. This is done because the supporting part 110 is provided in close-type or closed-type, i.e., cross-section having the closed curve shape.

The supporting protrusion 140 according to this embodiment may not be provided downward by a hooking operation between insertion holes and the bar 31. However, the supporting protrusion 140 may be provided in all the upward and downward directions to easily manage maintenance through compatibility of the same member.

In the case of this embodiment, there is inconvenience in that the heat exchange pipeline 117 and the close-type bidirectional spacing member 160 may have to be previously coupled to each other (that is, the required number of supporting parts 110 of the heat exchange pipeline 117 has to be previously inserted onto or around the heat exchange pipeline 117). However, since the bar 31 and the spacing member 160 are mutually fixed to each other to prevent the spacing member 160 installed at one end from being shaken, the post-coupling work may be convenient. Like the further another embodiment, there is an advantage in which the heat exchange pipeline 117 is supported by the spacing member 160 so that the relative positions between the bar 31 and the plate members 10 and 20 are accurately fixed.

In the close-type bidirectional spacing member 160, there is an inconvenience in that the heat exchange pipeline 117 may have to be inserted into the supporting part 110. Further another embodiment for solving this inconvenience will be disclosed below.

Various methods of installing the close-type bidirectional spacing member 160 on the vacuum adiabatic body will be described.

A first method is as follows. First, the close-type bidirectional spacing member 160, the supporting unit 30, and the heat exchange pipeline 117 may be assembled to manufacture an assembly. In a state in which a first plate member 10 and a second plate member 20 are temporarily separated, the assembly is inserted into a gap between the plate members 10 and 20. Thereafter, a third space or vacuum space part 50 may be sealed from external other spaces, and then, a gas within the third space may be exhausted.

A second method is as follows. First, the close-type bidirectional spacing member 160, the supporting unit 30, and the heat exchange pipeline 117 may be assembled to manufacture an assembly. The assembly is seated on one plate member 10 or 20, and the other plate member 20 or 10 is coupled to the one plate member 10 or 20. Then, the third space is sealed from the external outer spaces. Then, the gas within the third space may be exhausted.

All the first method and the second method may be methods for manufacturing the assembly and performed as follows. First, the lower close-type bidirectional spacing member 160 is inserted onto the heat exchange pipeline 117. The close-type bidirectional spacing member 160 may move to a proper position so as to be seated on the supporting part 110.

Figure 18:
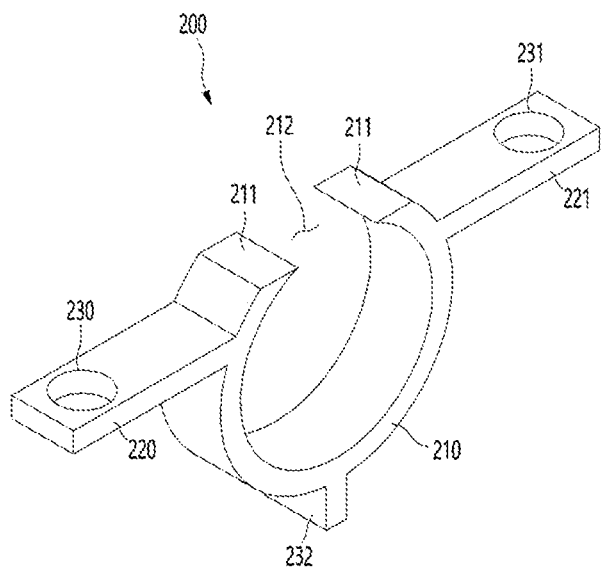
FIG. 18 is a perspective view of a spacing member according to further another embodiment.

FIG. 18 is a perspective view of a spacing member according to further another embodiment. A spacing member according to this embodiment may be an open-type bidirectional spacing member 200. The open-type bidirectional spacing member 200 may also restrict bidirectional movement of a heat exchange pipeline with a single spacing member 200. However, the open-type bidirectional spacing member 200 is different from the close-type bidirectional spacing member 160 in that a predetermined gap of a supporting part 120 is opened. Other descriptions are the same as those of the other embodiments in addition to the embodiment of FIG. 17, and thus, the description of FIG. 17 will be applied FIG. 18.

Referring to FIG. 18, the open-type bidirectional spacing member 200 includes a supporting part 210, wings 220 and 221, insertion holes 230 and 231, and a supporting protrusion 232 like the previously described embodiments.

Although the supporting part 210 is opened upward with respect to the drawings, an opened portion or space 212 of the supporting part 210 is narrow unlike the one-way spacing member 100. Due to the above-described shape, the heat exchange pipeline 117 may not freely pass through the opened portion 212. The opened portion 212 may be expanded or enlarged when the heat exchange pipeline 117 is inserted into the supporting part 210 and then contracted again after the heat exchange pipeline 117 is inserted into the supporting part 210. Thus, the heat exchange pipeline 117 already inserted into the supporting part 210 may be fixed so as not to be separated.

The supporting part 210 may have a circular shape of which an open or upper side is opened. Here, both end portions of the supporting part 210 and a gap between both the end portions may provide the opened portion 212, which may be a recessed groove, so that the heat exchange pipeline 117 is inserted into the supporting part 210. The opened portion 212 may be expanded by a movement of the supporting part 210 within a predetermined range. Since the opened portion 212 has an expandable structure due to the supporting part 210 being elastically deformable, the supporting part 210 may be called an elastically deformable frame. The spacing member 200 may be made of a resin and thus be elastically deformable with a predetermined range.

The open-type bidirectional spacing member 200 may be in a state of being installed at the bar 31, or not. Here, the opened portion 212 may be expanded as the supporting part 210 is spread so that the heat exchange pipeline 117 is inserted onto or around the supporting part 210. Alternatively, since the opened portion 212 is contracted by an elastic restoring force after the heat exchange pipeline 117 is inserted, the heat exchange pipeline 117 may not be separated without applying an external force, and an installation position of the heat exchange pipeline 117 may be fixed inside the supporting part 210.

Figure 19:
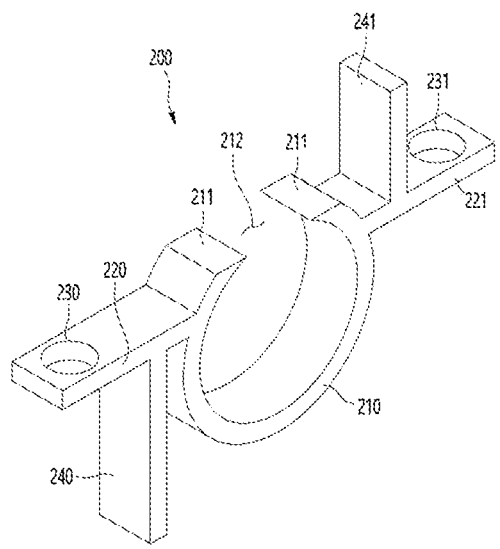
FIG. 19 is a perspective view of an open-type bidirectional spacing member according to further another embodiment.

FIG. 19 is a perspective view of an open-type bidirectional spacing member 200 according to further another embodiment. The open-type bidirectional spacing member 200 may be substantially the same as that of FIG. 18 except for a supporting protrusion 240 at a side. The description of FIG. 18 will be applied as it is without any specific explanation.

Referring to FIG. 19, a supporting part 210, wings 220 and 221, and insertion holes 230 and 231 may be equally provided like the open-type bidirectional spacing member 200 of FIG. 18. However, supporting protrusions 240 and 241 may not be provided on the supporting part 210 but provided on the wings 220 and 221. The wings 220 and 221 may include a first wing 220 and a second wing 221.

The supporting protrusions 240 and 241 may have a first supporting protrusion 240 and a second supporting protrusion 241, the second supporting protrusion 241 extending upward from the second wing 221 and the first supporting protrusion 240 extending downward from the first wing 220. According to this configuration, the movement of the supporting part 210 and the movement of the heat exchange pipeline 117 may be stopped by the supporting protrusions 240 and 241 either upward or downward.

Each of the supporting protrusions 240 and 241 may reduce thermal conductivity generated between the plate members 10 and 20 through the spacing member 200. That is to say, a thermal conduction path through the contact is extended from an end portion of the first supporting protrusion 240 to an end portion of the second supporting protrusion 241. Thus, the thermal conduction path includes the supporting part 210. Therefore, thermal conduction between the plate members 10 and 20 may be further reduced.

Figure 20:
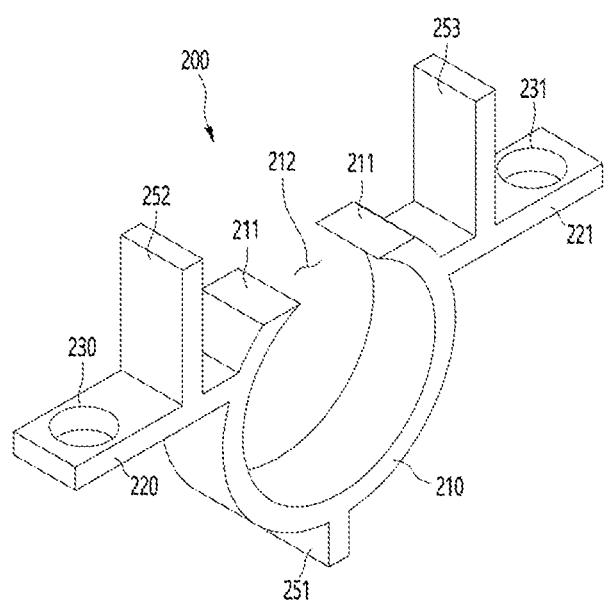
FIG. 20 is a perspective view of an open-type bidirectional spacing member according to further another embodiment.

FIG. 20 is a perspective view of an open-type bidirectional spacing member 200 according to further another embodiment. The open-type bidirectional spacing member may be substantially the same as that of FIGS. 18 and 19 except for an arrangement of supporting protrusions. The description of FIGS. 18 and 19 will be applied as it is without any specific explanation.

Referring to FIG. 20, a supporting part 210, wings 220 and 221, and insertion holes 230 and 231 may be equally provided like the open-type bidirectional spacing member according to the forgoing embodiment. However, there may be at least three supporting protrusions 251, 252, and 253. The supporting protrusions 251, 252, and 253 may include a first supporting protrusion 251, a second supporting protrusion 252, and a third supporting protrusion 253. The first supporting protrusion 251 may be provided at a lower portion or surface of the supporting part 210 to extend downward, and the second and third supporting protrusions 252 and 253 may be provided on upper portions or surfaces of wings 220 and 221, respectively, to extend upward.

The supporting protrusions 252 and 253 may have both sides extending upward from the wings 220 and 221. According to this configuration, the movement of the supporting part 210 and the movement of the heat exchange pipeline 117 may be stopped by the supporting protrusions 251, 252, and 253 either upward or downward.

The open-type bidirectional spacing member 200 according to this embodiment may be applied to a case in which force for allowing the spacing member 200 to support the heat exchange pipeline 117 is large because movement of the heat exchange pipeline 117 is large.

The spacing member 200 may be advantageous in that the installation of the radiation resistance sheet 32 is convenient. In detail, it is possible to realize a configuration in which both upward and downward movement along the bar 31 is restricted by the action of the supporting protrusions 251, 252, and 253 of the bidirectional spacing member 200. In this case, the spacing member 200 and the radiation resistance sheet 32 may be coupled to each other to improve workability or convenience of installation. Here, thermal conductivity may be easy through the radiation resistance sheet 32 and the spacing member 200.

Figure 21:
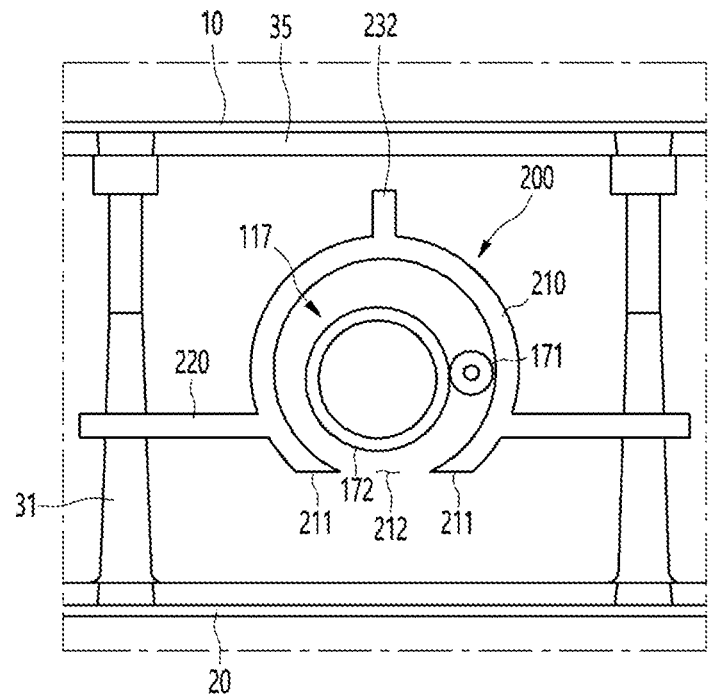
FIGS. 21 to 23 are front views illustrating a state in which the open-type bidirectional spacing member of FIGS. 18 to 20 is installed on a bar and the heat exchange pipeline.
Figure 22:
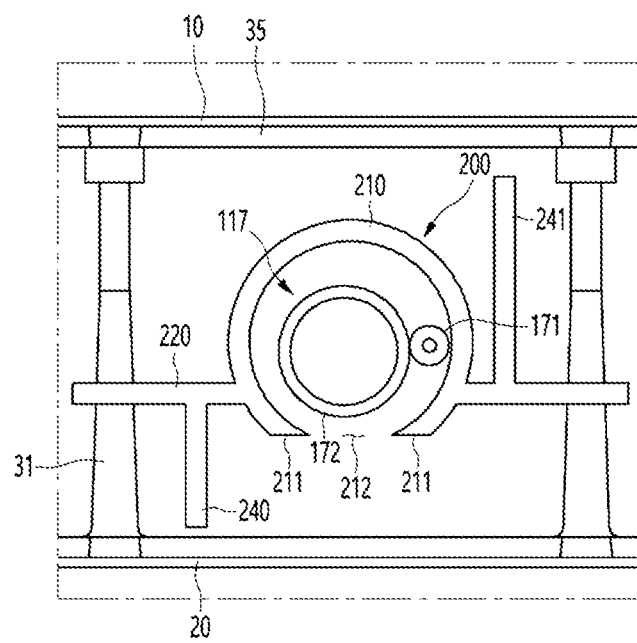
Figure 23:
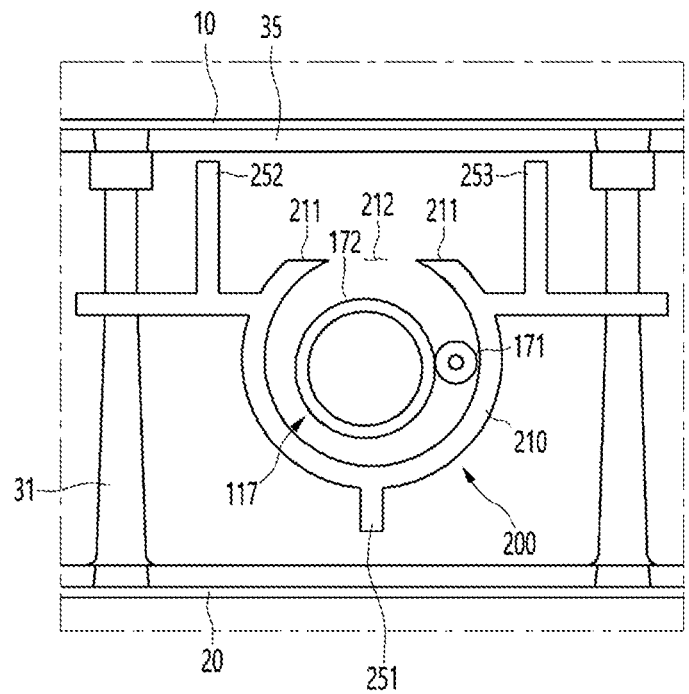

FIGS. 21 to 23 are front views illustrating a state in which an open-type bidirectional spacing member 200 of FIGS. 18 to 20 is installed on the bar 31 and the heat exchange pipeline 117.

Referring to FIG. 21, the downward movement of the open-type bidirectional spacing member 200 may be restricted due to the contact with the wing2 220 and 221 and the bar 31. The upward movement of the open-type bidirectional spacing member 200 may be restricted by the supporting protrusion 232.

Referring to FIG. 22, all of the downward movement and the upward movement of the open-type bidirectional spacing member 200 may be restricted by the supporting protrusions 240 and 241. Contact with the wings 220 and 221 and the bar 31 may be unnecessary, and each of the insertion holes 230 and 231 may have a diameter greater than that of the bar 31 to reduce the thermal conduction due to the contact between the spacing member 200 and the bar 31.

Referring to FIG. 23, the downward movement of the open-type bidirectional spacing member 200 may be restricted by the supporting protrusion 251 provided on the supporting part 210. The upward movement of the open-type bidirectional spacing member 200 may be restricted by the supporting protrusions 252 and 253 provided on the wings 220 and 221.

Also, in this case, the contact with the wings 220 and 221 and the bar 31 via the supporting protrusions 252 and 253 may be unnecessary, and each of the insertion holes 230 and 231 may have a diameter greater than that of the bar 31 to reduce the thermal conduction due to the contact between the spacing member 200 and the bar 31.

Figure 24:
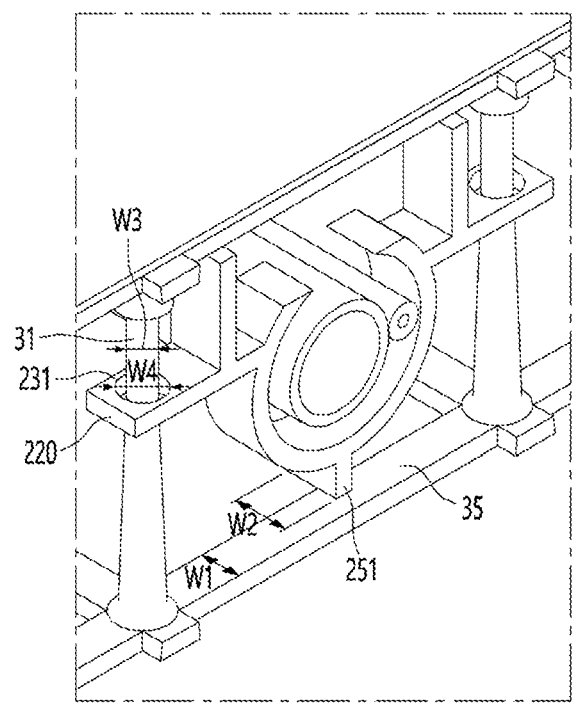
FIG. 24 is a view illustrating a state in which the open-type bidirectional spacing member is installed.

FIG. 24 is a view illustrating a state in which the open-type bidirectional spacing member 200 is installed.

Referring to FIG. 24, the open-type bidirectional spacing member may have a width w2 in a front-rear direction greater than a width w1 of each of the lattice frames constituting the support plate 35. Thus, even though the spacing member 200 moves by the heat exchange pipeline 117, twisting by a movement of the supporting protrusion 251 and by the support plate 35 may be reduced or prevented. Alternatively, a width of the supporting protrusion 251, but not the width w2 of the entire spacing member 200, may be greater than the width w1 of the lattice frames of the support plate 35.

The insertion holes 230 and 231 may have a width w4 greater than a diameter or width w3 of the bar 31 at an upper portion. For example, the insertion holes 230 and 231 may have a width w4 that is about 1.2 times to about 2.0 time the diameter w3 of the bar 31 at the upper portion. Thus, the contact between the wings 220 and 221 and the bar 31 may be prevented to better reduce the thermal conduction. In addition, when the opened portion 212 is expanded so that the heat exchange pipeline 117 is inserted in the state in which the open-type bidirectional spacing member 200 is supported by the bar 31, the opened portion 212 may function as a tolerance that is capable of accepting a deformation of the wings 220 and 221.

The description of this drawing may be applied to all open-type bidirectional spacing members as well.

Figure 25:
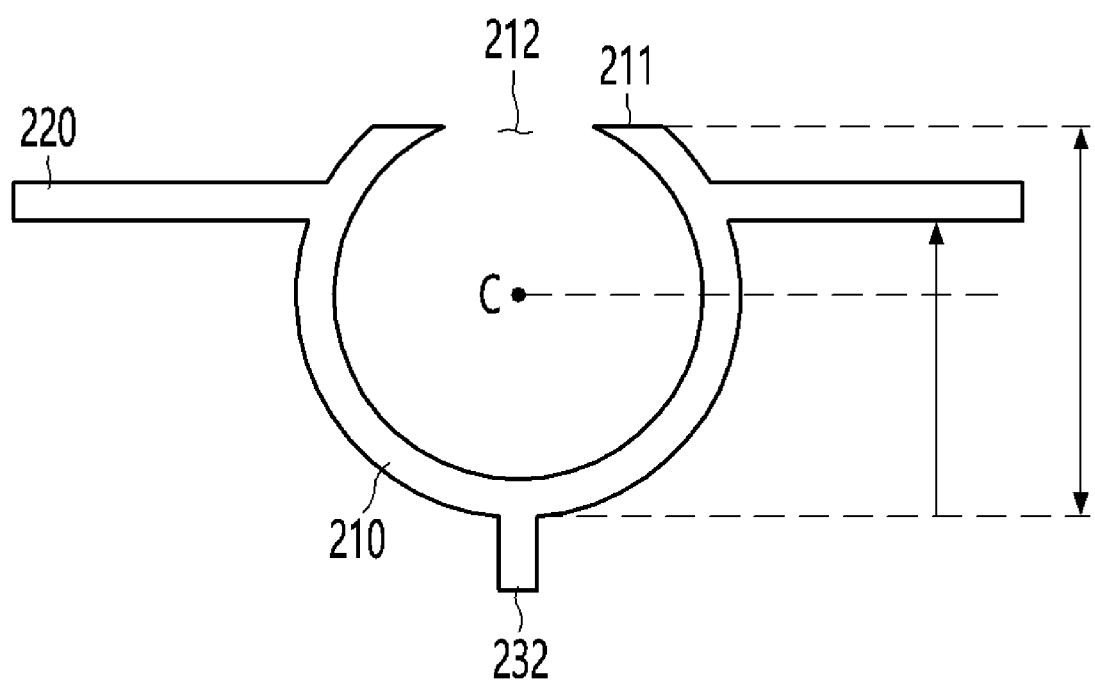
FIG. 25 is a front view of the open-type spacing member.

FIG. 25 is a front view of the open-type spacing member.

Referring to FIG. 25, the wings 220 and 221 may be provided above a geometrical center C of the supporting part 210. Thus, the opened portion 212 may be expanded to realize an effect in which the support part 210 sufficiently provides an elastically deformable section. That is to say, all the lower supporting parts 210 on which the wings 210 and 220 provided may serve as springs or elastic members. The description of this drawing may be applied to all open-type bidirectional spacing members as well.

Various methods of installing the open-type bidirectional spacing member on the vacuum adiabatic body will be described.

A first method is as follows. First, the open-type bidirectional spacing member 200, the supporting unit 30, and the heat exchange pipeline 117 may be assembled to manufacture an assembly. In a state in which a first plate member 10 and a second plate member 20 are temporarily separated, the assembly is inserted into a gap between the plate members 10 and 20. Thereafter, a third space may be sealed from external other spaces, and then, a gas within the third space may be exhausted.

A second method is as follows. First, the open-type bidirectional spacing member 200, the supporting unit 30, and the heat exchange pipeline 117 may be assembled to manufacture an assembly. The assembly is seated on one plate member 10 or 20, and the other plate member 20 or 10 is coupled to the one plate member 10 or 20. Then, the third space is sealed from the external outer spaces. Then, the gas within the third space may be exhausted.

All the first method and the second method may be methods for manufacturing the assembly and performed as follows. First, the heat exchange pipeline 117 is inserted into the open-type bidirectional spacing member 200. The open-type bidirectional spacing member 200 may move to a proper position so that the heat exchange pipeline 117 may be seated on the supporting part 210. As an alternative method, the open-type bidirectional spacing member is seated via the supporting unit. The opened portion 212 of the open-type bidirectional spacing member 200 may be enlarged so that the heat exchange pipeline 117 is inserted into the supporting part 210.

A third method is as follows. First, in a state in which the heat exchange pipeline 117 is provided in one plate member 10 or 20, the heat exchange pipeline 117 may be inserted into the supporting part 210 of the open-type bidirectional spacing member 200. Here, the open-type bidirectional spacing member 200 may be in the state of being coupled to the supporting unit 30 or not yet coupled to the supporting unit 30. Thereafter, the other plate member 20 or 10 may be coupled to the one plate member 10 or 20, and the third space may be sealed from external other spaces. Then, the gas within the third space may be exhausted.

All the spacing members 100 and 200 disclosed in the embodiments may be fixed by the supporting unit 30 without moving. For example, the bar 31 may be inserted into the insertion holes 230 and 231 provided in the spacing member 100 or 200, and the spacing member 100 or 200 including the wings 120 and 121 in which the insertion holes 230 and 231 are defined may be fixed by the supporting unit 30 including the bar 31. Here, the spacing member 100 or 200 may slightly move by a gap between the components.

The heat exchange pipeline 117 may be provided within the spacing member 100 or 200. The heat exchange pipeline 117 may be provided within the supporting part 110 of the spacing member 100 or 200 and thus be fixed in position.

First fixing of the spacing member 100 or 200 due to the supporting unit 30 and second fixing of the heat exchange pipeline 117 due to the spacing member 100 or 200 may be realized at the same time. According to the first fixing and the second fixing, the heat exchange pipeline 117 may be fixed by the supporting unit 30. In detail, when the heat exchange pipeline 117 is placed in the direction in which the vacuum adiabatic body extends, the vertical and horizontal movement of the heat exchange pipeline 117 may be restricted by the supporting unit 30.

The heat exchange pipeline 117 may be prevented from vertically moving to reduce the adiabatic loss that occurs due to the contact between the heat exchange pipeline 117 and the plate members 10 and/or 20. The horizontal movement of the heat exchange pipeline 117 may be restricted to prevent the components (e.g., the radiation resistance sheet 32, the support plate 35, etc.) provided within the third space from colliding with the heat exchange pipeline 117 when an impact is applied to the vacuum adiabatic body, thereby protecting the components within the third space.

The horizontal movement of the heat exchange pipeline 117 may be restricted to prevent the heat exchange pipeline 117 from contacting and approaching the supporting unit 30, i.e., the bar 31, while the vacuum adiabatic body is manufactured. Thus, the inlet pipe 171 and the outlet pipe 172, which constitute the heat exchange pipeline 117, may be promoted in heat transfer therebetween, and the heat transfer between the inlet and outlet pipes 171 and 172 and the supporting unit 30 may be prevented to reduce the adiabatic loss. In addition, an impact applied to the supporting unit 20, i.e., the bar 31, due to the horizontal movement of the heat exchange pipeline 117 may be prevented to improve reliability of the vacuum adiabatic body.

INDUSTRIAL APPLICABILITY

The present disclosure may provide a structure that is capable of reliably supporting the heat exchange pipeline as the method for further improving the adiabatic efficiency of the vacuum adiabatic body that is applied to the refrigeration cycle. Therefore, the convenient workability or installation and the reliability of the product may be secured, and the production yield of the product may be improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum adiabatic body, comprising:
a first plate;
a second plate spaced apart from the first plate in a first direction to form a vacuum space between the first plate and the second plate;
a pipeline provided in the vacuum space;
a support configured to maintain the vacuum space between the first and second plates, the support including a first bar and a second bar that separately extend in the first direction between the first plate and the second plate; and
at least one spacer disposed between the first and second bars and including a guide having a curved portion configured to receive a part of the pipeline and to restrict movement of the pipeline in a second direction that is perpendicular to the first direction, and
wherein the curved portion of the guide is to partially surround the part of the pipeline and has an opened portion between ends of the curved portion of the guide.

2. The vacuum adiabatic body according to claim 1, wherein the at least one spacer is coupled to the first bar and to the second bar.

3. The vacuum adiabatic body according to claim 1, wherein the at least one spacer is made of a non-metallic material.

4. The vacuum adiabatic body according to claim 1, wherein the opened portion has a size configured to permit movement of the pipeline.

5. The vacuum adiabatic body according to claim 1, wherein the opened portion has a size configured to restrict movement of the pipeline in all directions.

6. The vacuum adiabatic body according to claim 1, wherein the guide is made of a deformable resin material such that the opened portion is configured to be expanded and contracted by movement of the guide.

7. The vacuum adiabatic body according to claim 1, wherein the at least one spacer includes:
a first wing that extends from the guide to the first bar in the second direction, and having a first opening for the first bar to partially pass therethrough, and
a second wing that extends from the guide to the second bar in a direction opposite to the second direction, and having a second opening for the second bar to partially pass therethrough.

8. The vacuum adiabatic body according to claim 7, wherein at least one of the first and second wings is provided at a position that is off-center along the first direction of the guide and is closer to the opened portion than a closed side opposite the opened portion.

9. The vacuum adiabatic body according to claim 7, wherein an inner surface of the first opening is spaced a predetermined distance away from an outer surface of the first bar.

10. The vacuum adiabatic body according to claim 1, further comprising a radiation resistance sheet provided in the vacuum space and configured to reduce radiation heat transfer between the first and second plates, wherein the radiation resistance sheet has a size configured to not contact the spacer.

11. A vacuum adiabatic body, comprising:
a first plate having a first plane;
a second plate spaced apart from the first plate in a first direction to form a vacuum space between the first plate and the second plate, the second plate having a second plane;
a pipeline provided in the vacuum space;
a support configured to support the first and second plates forming the vacuum space, the support including a first bar and a second bar each separately extending in the first direction between the first plate and the second plate; and
at least one spacer that extends between the first bar and the second bar, and is configured to receive a part of the pipeline and to restrict movement of the pipeline,
wherein the at least one spacer is disposed between the first plane of the first plate and the second plane of the second plate.

12. The vacuum adiabatic body according to claim 11, wherein the at least one spacer includes a first wing having a first opening for the first bar to partially pass therethrough, and a second wing having a second opening for the second bar to partially pass therethrough.

13. The vacuum adiabatic body according to claim 12, wherein an inner surface of the first opening is spaced a predetermined distance away from an outer surface of the first bar.

14. The vacuum adiabatic body according to claim 12, wherein the at least one spacer includes a guide between the first wing and the second wing, and the guide includes a curved portion configured to receive the part of the pipeline so as to restrict movement of the pipeline.

15. The vacuum adiabatic body according to claim 14, wherein at least one of the first and second wings is provided at a position that is off-center along the first direction of the guide and is closer to an opened portion of the guide than a closed side opposite the opened portion.

16. The vacuum adiabatic body according to claim 14, wherein the spacer includes a protrusion that extends from the spacer toward the second plate in the first direction or toward the first plate in a direction opposite to the first direction.

17. A vacuum adiabatic body, comprising:
a first plate;
a second plate spaced apart from the first plate in a first direction to form a vacuum space between the first plate and the second plate;
a pipe provided in the vacuum space;
a support configured to support the first and second plates, the support including a first bar and a second bar that separately extend in the first direction between the first plate and the second plate; and
a spacer disposed between the first and second bars and including a guide having a curved portion configured to receive a part of the pipe and an opened portion between ends of the curved portion, a first wing that extends from the guide to the first bar, and a second wing that extends from the guide to the second bar,
wherein the first wing and the second wing are arranged symmetrically with respect to the guide.

18. The vacuum adiabatic body according to claim 17, wherein the spacer includes a protrusion that extends from the spacer toward the second plate or toward the first plate.

19. The vacuum adiabatic body according to claim 18, wherein the protrusion extends from the curved portion of the guide.

20. A vacuum adiabatic body, comprising:
a first plate;
a second plate spaced apart from the first plate in a first direction to form a vacuum space between the first plate and the second plate;
a pipeline provided in the vacuum space;
a support configured to support the first and second plates forming the vacuum space, the support including a first bar and a second bar each separately extending in the first direction between the first plate and the second plate; and
at least one spacer that extends between the first bar and the second bar, and is configured to receive a part of the pipeline and to restrict movement of the pipeline,
wherein the at least one spacer includes a first wing having a first opening for the first bar to partially pass therethrough, and a second wing having a second opening for the second bar to partially pass therethrough, and
wherein an inner surface of the first opening is spaced a predetermined distance away from an outer surface of the first bar.

21. A vacuum adiabatic body, comprising:
a first plate;
a second plate spaced apart from the first plate in a first direction to form a vacuum space between the first plate and the second plate;
a pipeline provided in the vacuum space;
a support configured to support the first and second plates forming the vacuum space, the support including a first bar and a second bar each separately extending in the first direction between the first plate and the second plate; and
at least one spacer that extends between the first bar and the second bar, and is configured to receive a part of the pipeline and to restrict movement of the pipeline,
wherein the at least one spacer includes:
a first wing having a first opening for the first bar to partially pass therethrough,
a second wing having a second opening for the second bar to partially pass therethrough, and
a guide provided between the first wing and the second wing and including a curved portion configured to receive the part of the pipeline so as to restrict movement of the pipeline, and
wherein at least one of the first and second wings is provided at a position that is off-center along the first direction of the guide and is closer to an opened portion of the guide than a closed side opposite the opened portion.

* * * * *